US012499662B2

(12) United States Patent
Piergiovanni et al.

(10) Patent No.: US 12,499,662 B2
(45) Date of Patent: Dec. 16, 2025

(54) DYNAMIC TRAINING OF MODELS

(71) Applicant: Google LLC, Mountain View, CA (US)

(72) Inventors: Anthony Jacob Piergiovanni, Denver, CO (US); Weicheng Kuo, Santa Clara, CA (US); Wei Li, Fremont, CA (US); Anelia Angelova, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 378 days.

(21) Appl. No.: 18/350,845

(22) Filed: Jul. 12, 2023

(65) Prior Publication Data
US 2024/0029413 A1    Jan. 25, 2024

Related U.S. Application Data

(60) Provisional application No. 63/388,791, filed on Jul. 13, 2022.

(51) Int. Cl.
*G06V 10/774* (2022.01)
*G06V 10/25* (2022.01)

(52) U.S. Cl.
CPC ............ *G06V 10/774* (2022.01); *G06V 10/25* (2022.01); *G06V 2201/07* (2022.01)

(58) Field of Classification Search
None
See application file for complete search history.

(56) References Cited

U.S. PATENT DOCUMENTS

| 2021/0166385 | A1* | 6/2021 | Shang | G06T 7/0012 |
| 2023/0267307 | A1* | 8/2023 | Wang | G06N 3/006 |
| | | | | 706/25 |

OTHER PUBLICATIONS

Zellers et al., Merlot: Multimodal neural script knowledge models. Advances in Neural Information Processing Systems, 34:23634-23651, 2021.
Zhang et al., Vinvl: Revisiting visual representations in vision-language models. In Proceedings of the IEEE/CVF Conference on Computer Vision and Pattern Recognition, pp. 5579-5588, 2021.
Agrawal et al., "Vqa: Visual question answering", In ICCV, 2015.
Alayrac et al., "Flamingo: a visual language model for few-shot learning", 2022.
Aribandi et al., "Ext5: Towards extreme multi-task scaling for transfer learning", ICLR 2022, pp. 1-28.
Yoshua Bengio, Jerome Louradour, Ronan Collobert, and Jason Weston. Curriculum learning. In ICML, 2009.
Changpinyo et al., Conceptual 12m: Pushing web-scale image-text pre-training to recognize long-tail visual concepts. In CVPR, 2021.

(Continued)

*Primary Examiner* — Leon Flores
(74) *Attorney, Agent, or Firm* — McDonnell Boehnen Hulbert & Berghoff LLP

(57) ABSTRACT

A method involves the training of a model by dynamically adjusting the number of examples within each training batch. The dynamic adjustment is accomplished by adjusting the number of examples per task within each training batch according to the performance of the model on the tasks that the model is being trained on. In some embodiments, this method is applied to cross-modal vision-language tasks. This model may also be applied to the pre-training of a model that can be later fine-tuned for a more specific task(s).

20 Claims, 8 Drawing Sheets

(56) References Cited

OTHER PUBLICATIONS

Chen et al., Pix2seq: A language modeling framework for object detection. In ICLR, 2022.
Chen et al., Uniter: Universal image-text representation learning. In ECCV, 2020.
Cho et al., Unifying vision-and-language tasks via text generation. In Arxiv 2102.02779, 2021.
Deng et al., Imagenet: A large-scale hierarchical image database. In CVPR, 2009.
Deng et al., Transvg: End-toend visual grounding with transformers. ICCV, 2021.
Dou et al., An empirical study of training end-to-end vision-and-language transformers. In Proceedings of the IEEE/CVF Conference on Computer Vision and Pattern Recognition, pp. 18166-18176, 2022.
Gan et al., Large-scale adversarial training for vision-and-language representation learning. In NeurIPS, 2020.
Gottumukkala et al., Dynamic sampling strategies for multi-task reading comprehension. In Proceedings of the 58th Annual Meeting of the Association for Computational Linguistics, pp. 920-924, 2020.
He et al., Deep residual learning for image recognition. In Proceedings of the IEEE conference on computer vision and pattern recognition, 2016.
He et al., Momentum contrast for unsupervised visual representation learning. In CVPR, 2020.
He et al., Masked autoencoders are scalable vision learners. arXiv preprint arXiv:2111.06377, 2021.
Hjelm et al., Learning deep representations by mutual information estimation and maximization. In ICLR, 2019.
Hudson et al., Gqa: a new dataset for compositional question answering over realworld images. In CVPR, 2019.
Jia et al., Scaling up visual and vision-language representation learning with noisy text supervision. In ICML, 2021.
Kamath et al., Mdetr—modulated detection for end-to-end multi-modal understanding. In https://arxiv.org/abs/2104.12763, 2021.
Kim et al., Vilt: Vision-and-language transformer without convolution or region supervision. In ICML, 2021.
Krishna et al., Visual genome: Connecting language and vision using crowdsourced dense image annotations. 2016.
Kuznetsova et al. The open images dataset v4. ICCV, 128(7):1956-1981, 2020.
Le et al., Hierarchical conditional relation networks for video question answering. In CVPR, 2020.
Lei et al., Less is more: Clipbert for video-and-language learning via sparse sampling. In CVPR, 2021.
Li et al., Align before fuse: Vision and language representation learning with momentum distillation. Advances in neural information processing systems, 34:9694-9705, 2021.
Li et al., Blip: Bootstrapping language image pre-training for unified vision-language understanding and generation. arXiv preprint arXiv:2201.12086, 2022.
Li et al., Visualbert: A simple and performant baseline for vision and language. arXiv preprint arXiv:1908.03557, 2019.
Lu et al., Vilbert: Pretraining task-agnostic visiolinguistic representations for vision-and-language tasks. In CVPR, 2019.
Lu et al., 12-in-1: Multi-task vision and language representation learning. In CVPR, 2020.
Mao et al., Generation and comprehension of unambiguous object descriptions. In CVPR, 2016.
Miech et al., Howto100m: Learning a text-video embedding by watching hundred million narrated video clips. In ICCV, 2019.
Miech et al., End-to-end learning of visual representations from uncurated instructional videos. In CVPR, 2020.
Nguyen et al., Coarse-to-fine reasoning for visual question answering. In Multimodal Learning and Applications (MULA) Workshop, CVPR, 2022.
Pont-Tuset et al., Connecting vision and language with localized narratives. In ECCV, 2020.
Radford et al., Learning transferable visual models from natural language supervision. In ICML, 2021.
Raffel et al., Exploring the limits of transfer learning with a unified text-to-text transformer. In Journal of Machine Learning Research, 2020.
Sharma et al., Conceptual captions: A cleaned, hypernymed, image alt-text dataset for automatic image captioning. In ACL, 2018.
Singh et al., Flava: A foundational language and vision alignment model. In arxiv.org/pdf/2112.04482.pdf, 2022.
Suhr et al., A corpus of natural language for visual reasoning. In Proceedings of the 55th Annual Meeting of the Association for Computational Linguistics, 2017.
Tan et al., Lxmert: Learning cross-modality encoder representations from transformers. In EMNLP, 2019.
Tian et al., Contrastive multiview coding. In ICML Workshop, 2020.
Wang et al., All in one: Exploring unified video-language pre-training. arXiv preprint arXiv:2203.07303, 2022.
Wang et al., Simvim: Simple visual language model pretraining with weak supervision. In https://arxiv.org/pdf/2108.10904.pdf, 2021.
Xu et al., Video question answering via gradually refined attention over appearance and motion. In ACM Multimedia, 2017.
Xu et al., Msr-vtt: A large video description dataset for bridging video and language. In CVPR, 2016.
Xu et al., Multi-task learning with sample re-weighting for machine reading comprehension. arXiv preprint arXiv:1809.06963, 2018.
Yang et al., Just ask: Learning to answer questions from millions of narrated videos. In ICCV, 2021.
Yu et al., Modeling context in referring expressions. In ECCV, 2016.
Yuan et al., Florence: A new foundation model for computer vision. In arxiv.org/pdf/2110.02095.pdf, 2022.

\* cited by examiner

510 Obtain a training dataset that includes a plurality of training examples and that represents at least two different training tasks, wherein each training examples corresponds to a respective training task

520 Select, from the training examples of the training dataset, a training batch that includes at least one training example corresponding to each of the training tasks

530 Apply the training batch to train a machine learning model, wherein applying the training batch to train the machine learning model comprises determining a sample loss of the model with respect to each training example in the training batch

540 Determine a per-task loss for each of the training tasks, wherein determining the per-task loss for a particular training task comprises determining the sample loss for the particular training task based on the determined sample losses for each of the training examples in the training batch that correspond to the particular training task

550 Select, from the training examples of the training dataset, a new training batch for training the machine learning model, wherein the second training batch includes at least one training example corresponding to each of the training tasks and such that training tasks having higher per-task losses are represented by more training examples in the second training batch

FIG. 5

DYNAMIC TRAINING OF MODELS

CROSS-REFERENCE TO RELATED APPLICATION

This application claims priority to U.S. Provisional Patent Application No. 63/388,791, filed on Jul. 13, 2022, the contents of which are hereby incorporated by reference in their entirety.

BACKGROUND

Training is a fundamental, but often data, compute, and/or and time intensive, procedure for all machine learning processes. An important aspect of training a machine learning model is selecting and/or pre-processing training examples from a set of available samples to avoid overfitting of the available data and/or to compensate for statistical imperfections in the available data. For example, training examples can be augmented or otherwise re-sampled in order to increase the effect of rare but relatively important types of training data (e.g., augmenting instances of a rare disease within a training data set such that relative proportions of the training samples that represent diseased and non-diseased states are more balanced). Training a model can include applying a training example to the untrained model to generate an untrained model output. The untrained model output can then be used to generate a loss of the untrained model with respect to the training example (e.g., by determining a difference between the untrained model output and a known 'ground truth' model output for the training example). The loss can then be used, potentially in combination with losses determined for a plurality of other training examples, to update (or 'train') the untrained model (e.g., using backpropagation or other training methods).

SUMMARY

In a first aspect, a method for training a machine learning model is provided that includes: (i) obtaining a training dataset that includes a plurality of training examples and that represents at least two different training tasks, wherein each training example corresponds to a respective training task; (ii) selecting, from the training examples of the training dataset, a first training batch that includes at least one training example corresponding to each of the training tasks; (iii) applying the first training batch to train a machine learning model, wherein applying the first training batch to train the machine learning model comprises determining a sample loss of the model with respect to each training example in the first training batch; (iv) determining a per-task loss for each of the training tasks, wherein determining the per-task loss for a particular training task comprises determining the sample loss for the particular training task based on the determined sample losses for each of the training examples in the first training batch that correspond to the particular training task; and (v) selecting, from the training examples of the training dataset, a second training batch for training the machine learning model, wherein the second training batch includes at least one training example corresponding to each of the training tasks and such that training tasks having higher per-task losses are represented by more training examples in the second training batch.

In a second aspect, a method for fine-tuning a machine learning model to improve the performance of the machine learning model with respect to at least one fine-tuning task is provided that includes: (i) obtaining a machine learning model that has been trained according to a method that includes: (a) obtaining a training dataset that includes a plurality of training examples and that represents at least two different training tasks, wherein each training example corresponds to a respective training task; (b) selecting, from the training examples of the training dataset, a first training batch that includes at least one training example corresponding to each of the training tasks; (c) applying the first training batch to train a machine learning model, wherein applying the first training batch to train the machine learning model comprises determining a sample loss of the model with respect to each training example in the first training batch; (d) determining a per-task loss for each of the training tasks, wherein determining the per-task loss for a particular training task comprises determining the sample loss for the particular training task based on the determined sample losses for each of the training examples in the first training batch that correspond to the particular training task; and (e) selecting, from the training examples of the training dataset, a second training batch for training the machine learning model, wherein the second training batch includes at least one training example corresponding to each of the training tasks and such that training tasks having higher per-task losses are represented by more training examples in the second training batch; (ii) obtaining a fine-tuning dataset that represents the at least one fine-tuning task; and (iii) applying the fine-tuning dataset to train the machine learning model.

In a third aspect, a computer-implemented method is provided that includes: (i) obtaining an input; and (ii) applying the input to a machine learning model to generate an output, wherein the machine learning model has been trained by: (a) obtaining a training dataset that includes a plurality of training examples and that represents at least two different training tasks, wherein each training example corresponds to a respective training task; (b) selecting, from the training examples of the training dataset, a first training batch that includes at least one training example corresponding to each of the training tasks; (c) applying the first training batch to train a machine learning model, wherein applying the first training batch to train the machine learning model comprises determining a sample loss of the model with respect to each training example in the first training batch; (d) determining a per-task loss for each of the training tasks, wherein determining the per-task loss for a particular training task comprises determining the sample loss for the particular training task based on the determined sample losses for each of the training examples in the first training batch that correspond to the particular training task; and (e) selecting, from the training examples of the training dataset, a second training batch for training the machine learning model, wherein the second training batch includes at least one training example corresponding to each of the training tasks and such that training tasks having higher per-task losses are represented by more training examples in the second training batch.

BRIEF DESCRIPTION OF THE FIGURES

FIG. 5 is a flowchart of a method, in accordance with example embodiments.

DETAILED DESCRIPTION

I. Overview

Figure 1:
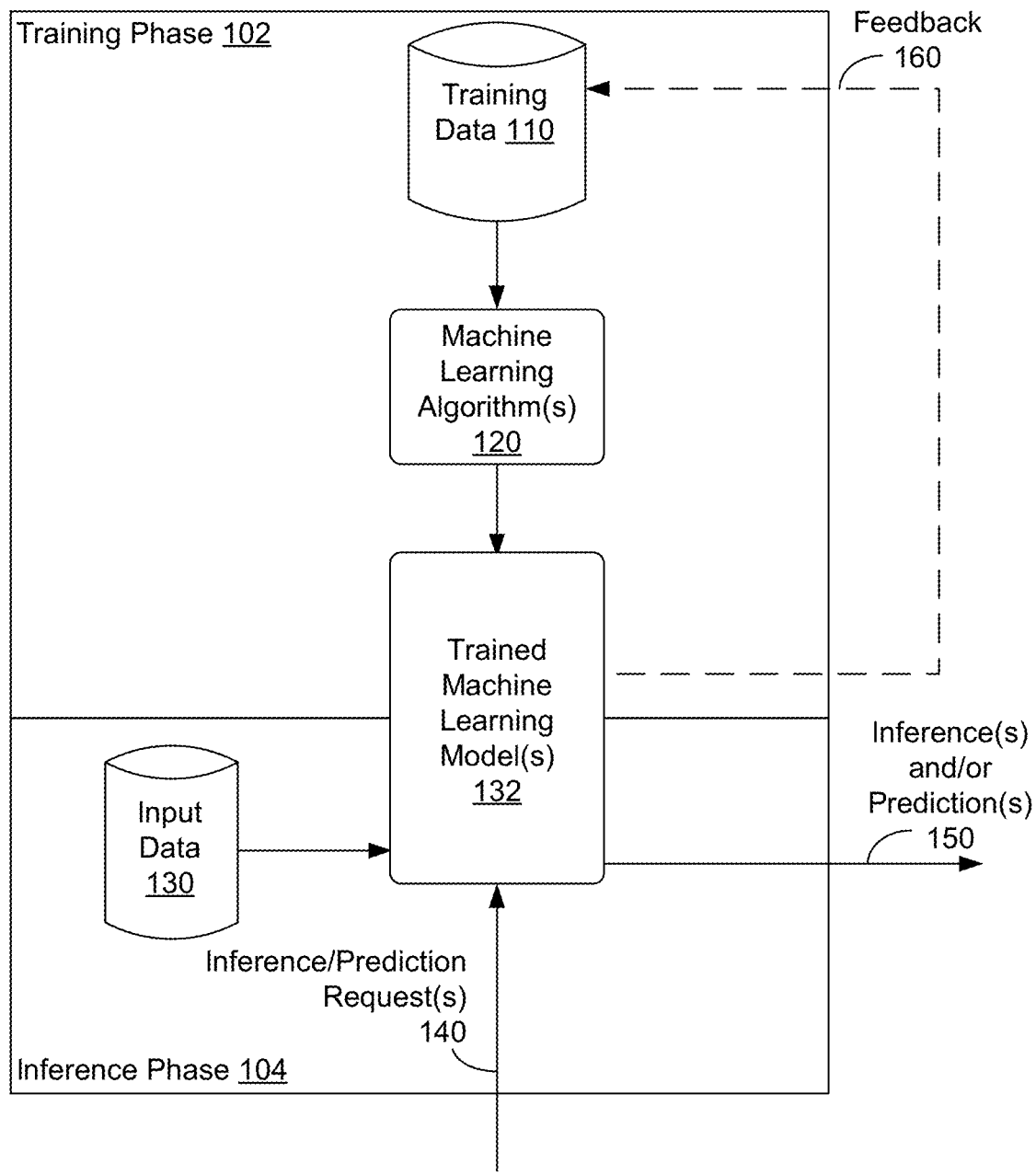
FIG. 1 is a diagram illustrating training and inference phases of a machine learning model, in accordance with example embodiments.

The ability to create cross-modal models is a valuable part of contemporary artificial intelligence development. Such cross-model models can be pre-trained to represent a broad scope of information across a variety of subjects. A model pre-trained in such a manner can then be fine-tuned and applied to one of a variety of diverse specific tasks. Methods for training such cross-modal models often require large datasets that may be expensive or otherwise difficult to access. Such methods may also exhibit difficulty in retaining "knowledge" of different training tasks across the training process. Loss of such "knowledge" across the training process can lead to reduced reliability of the trained model with respect to all of the training tasks and increased difficulty in extrapolating the pre-trained model into areas for which the model was not explicitly trained.

Embodiments described herein provide improved methods for training machine learning models, including cross-modal models. These embodiments can include training a machine learning model using training datasets that include multiple different tasks. The relative representation of the different tasks in training the model is adjusted over time (e.g., from training batch to training batch) according to how well the model performs with respect to each task. The representation of tasks for which the model has recently performed poorly is increased, while the representation of tasks for which the model has recently performed well is decreased, thus emphasizing "harder" tasks for which the model most needs to improve.

Training a model in such a manner provides a variety of benefits. For example, a model that is trained using the methods described herein can perform as well as, or even better than, other state of the art models even when trained on a significantly smaller dataset. A trained model pre-trained according to the methods described herein can then be fine-tuned to perform a specific target task using fewer target task training iterations and/or a smaller training dataset specific to the target task. Additionally, a model trained according to the methods described herein can provide competitive results on novel tasks that it had not been trained on. This efficiency provides such models with competitive performance when the model has been trained, using the methods described herein, on small, publically available datasets rather than larger and/or more expensive proprietary datasets. Additionally, training a single model on multiple tasks in this manner allows the model to retain proficiency across all of the training tasks. This allows a single model, trained in the manner described herein, to be deployed to perform multiple different tasks, saving on storage and memory costs when compared to deploying multiple different models to perform respective different tasks. As another benefit, the model training methods described herein provide benefits as regards the parallelize-ability of such models when deployed for inference. In particular, since the models retain proficiency across multiple tasks, there is no need to load balance or otherwise specify the relative deployments (and associated allocations of memory, bandwidth, storage, compute, or other computational resources) of multiple different models that are only proficient with respect to respective different single tasks.

The methods described herein can be used for, but are in no way limited to, vision-language cross-modal tasks. When a model is trained using the presently disclosed methods, it can achieve similar or greater accuracy (relative to state of the art training methods) on a number of common vision-language tasks, such as Visual Question and Answering, Video Question and Answering, and Referring Expressions Comprehension than other state of the art models. This is despite the fact that a model trained using the methods described herein may not have been explicitly trained on such tasks. Additionally, such a model can be trained using 97% fewer training samples than other state of the art methods.

The methods described herein may be used for the training of any machine learning model (e.g., multi-modal models, or even generalist AI models) where multiple tasks are available to train the model. Tasks on which such a model can be trained can include not only image and/or text related tasks, but also text-to-text tasks (e.g., translations), audio-related tasks (e.g., speech to text, text to speech, image to speech), robotic tasks (e.g., context awareness and control), or video gaming tasks.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

II. Training Machine Learning Models for Generating Inferences/Predictions

FIG. 1 shows diagram 100 illustrating a training phase 102 and an inference phase 104 of trained machine learning model(s) 132, in accordance with example embodiments. Some machine learning techniques involve training one or more machine learning algorithms, on an input set of training data to recognize patterns in the training data and provide output inferences and/or predictions about (patterns in the) training data. The resulting trained machine learning algorithm can be termed as a trained machine learning model. For example, FIG. 1 shows training phase 102 where one or more machine learning algorithms 120 are being trained on training data 110 to become trained machine learning model(s) 132. Then, during inference phase 104, trained machine learning model(s) 132 can receive input data 130 and one or more inference/prediction requests 140 (perhaps as part of input data 130) and responsively provide as an output one or more inferences and/or prediction(s) 150.

As such, trained machine learning model(s) 132 can include one or more models of one or more machine learning algorithms 120. Machine learning algorithm(s) 120 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 120 may be supervised or unsupervised, and may implement any suitable combination of online and offline learning.

In some examples, machine learning algorithm(s) 120 and/or trained machine learning model(s) 132 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 120 and/or trained machine learning model(s) 132. In some examples, trained machine learning model(s) 132 can be trained, reside and execute to provide inferences on a particular computing device, and/or otherwise can make inferences for the particular computing device.

During training phase 102, machine learning algorithm(s) 120 can be trained by providing at least training data 110 as training input using unsupervised, supervised, semi-supervised, and/or reinforcement learning techniques. Unsupervised learning involves providing a portion (or all) of training data 110 to machine learning algorithm(s) 120 and machine learning algorithm(s) 120 determining one or more output inferences based on the provided portion (or all) of training data 110. Supervised learning involves providing a portion of training data 110 to machine learning algorithm(s) 120, with machine learning algorithm(s) 120 determining one or more output inferences based on the provided portion of training data 110, and the output inference(s) are either accepted or corrected based on correct results associated with training data 110. In some examples, supervised learning of machine learning algorithm(s) 120 can be governed by a set of rules and/or a set of labels for the training input, and the set of rules and/or set of labels may be used to correct inferences of machine learning algorithm(s) 120.

Semi-supervised learning involves having correct results for part, but not all, of training data 110. During semi-supervised learning, supervised learning is used for a portion of training data 110 having correct results, and unsupervised learning is used for a portion of training data 110 not having correct results. Reinforcement learning involves machine learning algorithm(s) 120 receiving a reward signal regarding a prior inference, where the reward signal can be a numerical value. During reinforcement learning, machine learning algorithm(s) 120 can output an inference and receive a reward signal in response, where machine learning algorithm(s) 120 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 120 and/or trained machine learning model(s) 132 can be trained using other machine learning techniques, including but not limited to, incremental learning and curriculum learning.

In some examples, machine learning algorithm(s) 120 and/or trained machine learning model(s) 132 can use transfer learning techniques. For example, transfer learning techniques can involve trained machine learning model(s) 132 being pre-trained on one set of data and additionally trained using training data 110. More particularly, machine learning algorithm(s) 120 can be pre-trained on data from one or more computing devices and a resulting trained machine learning model provided to computing device CD1, where CD1 is intended to execute the trained machine learning model during inference phase 104. Then, during training phase 102, the pre-trained machine learning model can be additionally trained using training data 110, where training data 110 can be derived from kernel and non-kernel data of computing device CD1. This further training of the machine learning algorithm(s) 120 and/or the pre-trained machine learning model using training data 110 of CD1's data can be performed using either supervised or unsupervised learning. Once machine learning algorithm(s) 120 and/or the pre-trained machine learning model has been trained on at least training data 110, training phase 102 can be completed. The trained resulting machine learning model can be utilized as at least one of trained machine learning model(s) 132.

In particular, once training phase 102 has been completed, trained machine learning model(s) 132 can be provided to a computing device, if not already on the computing device. Inference phase 104 can begin after trained machine learning model(s) 132 are provided to computing device CD1.

During inference phase 104, trained machine learning model(s) 132 can receive input data 130 and generate and output one or more corresponding inferences and/or prediction(s) 150 about input data 130. As such, input data 130 can be used as an input to trained machine learning model(s) 132 for providing corresponding inference(s) and/or prediction(s) 150 to kernel components and non-kernel components. For example, trained machine learning model(s) 132 can generate inference(s) and/or prediction(s) 150 in response to one or more inference/prediction requests 140. In some examples, trained machine learning model(s) 132 can be executed by a portion of other software. For example, trained machine learning model(s) 132 can be executed by an inference or prediction daemon to be readily available to provide inferences and/or predictions upon request. Input data 130 can include data from computing device CD1 executing trained machine learning model(s) 132 and/or input data from one or more computing devices other than CD1. For example, input data 130 can include a collection of images provided by one or more sources, and text labels for objects in the images. Other types of input data are possible as well.

Inference(s) and/or prediction(s) 150 can include output images, output intermediate images, numerical values, and/or other output data produced by trained machine learning model(s) 132 operating on input data 130 (and training data 110). In some examples, trained machine learning model(s) 132 can use output inference(s) and/or prediction(s) 150 as input feedback 1160. Trained machine learning model(s) 132 can also rely on past inferences as inputs for generating new inferences.

III. Example Data Network

Figure 2:
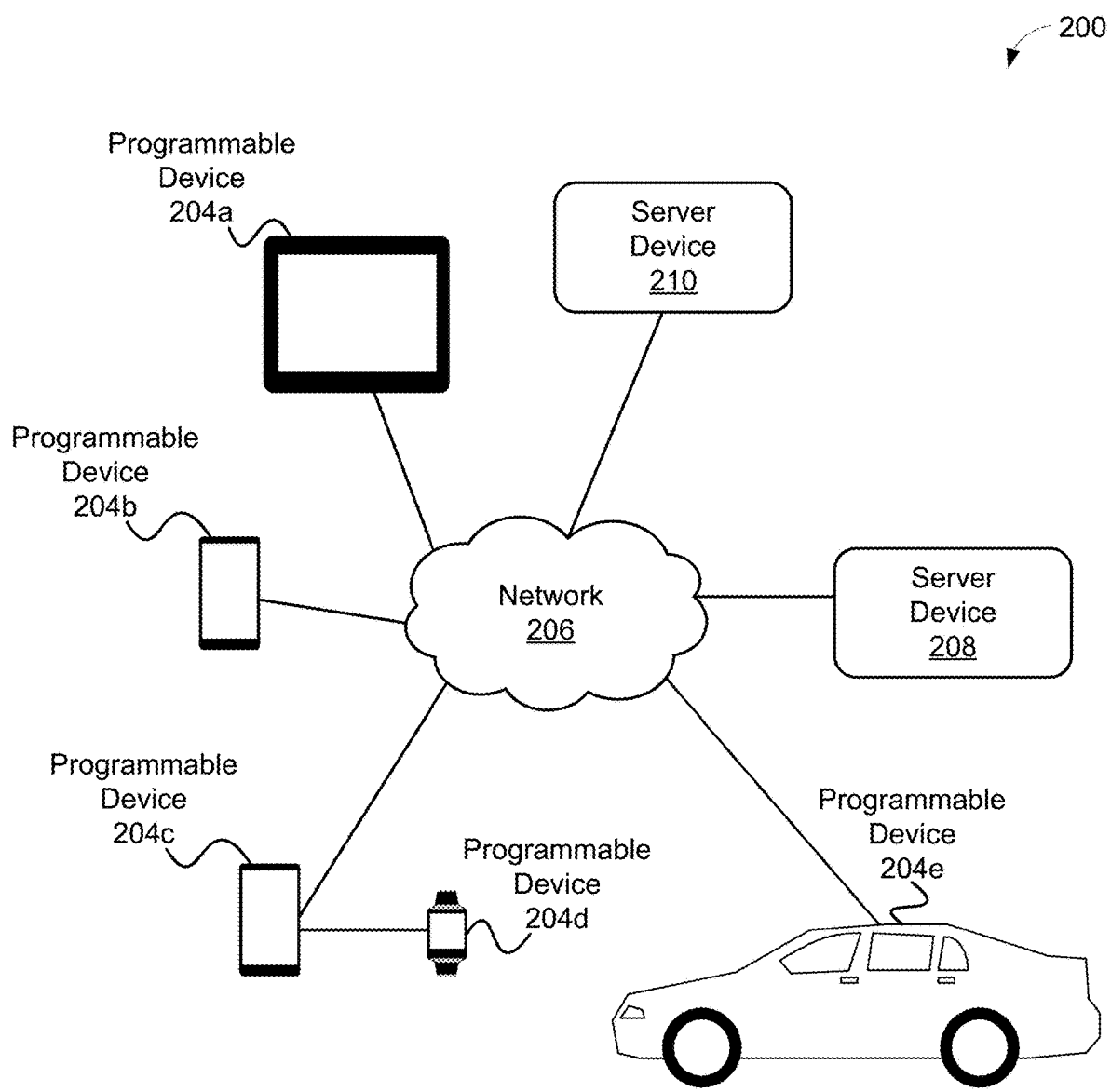
FIG. 2 depicts a distributed computing architecture, in accordance with example embodiments.

FIG. 2 depicts a distributed computing architecture 200, in accordance with example embodiments. Distributed computing architecture 200 includes server devices 208, 210 that are configured to communicate, via network 206, with programmable devices 204a, 204b, 204c, 204d, 204e. Network 206 may correspond to a local area network (LAN), a wide area network (WAN), a WLAN, a WWAN, a corporate intranet, the public Internet, or any other type of network configured to provide a communications path between networked computing devices. Network 206 may also correspond to a combination of one or more LANs, WANs, corporate intranets, and/or the public Internet.

Although FIG. 2 only shows five programmable devices, distributed application architectures may serve tens, hundreds, or thousands of programmable devices. Moreover, programmable devices 204a, 204b, 204c, 204d, 204e (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 204a, 204b, 204c, 204e, programmable devices can be directly connected to network 206. In other examples, such as illustrated by programmable device 204d, programmable devices can be indirectly connected to network 206 via an associated computing device, such as programmable device 204c. In this example, programmable device 204c can act as an associated computing device to pass electronic communications between programmable device 204d and network 206. In other examples, such as illustrated by programmable device 204e, a computing device can be part of and/or inside a vehicle, such as a car, a truck, a bus, a boat or ship, an airplane, etc. In other examples not shown in FIG. 2, a programmable device can be both directly and indirectly connected to network 206.

Server devices 208, 210 can be configured to perform one or more services, as requested by programmable devices 204a-204e. For example, server device 208 and/or 210 can provide content to programmable devices 204a-204e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 208 and/or 210 can provide programmable devices 204a-204e with access to software for database, search, computation, graphical, audio, video, World Wide Web/Internet utilization, and/or other functions. Many other examples of server devices are possible as well.

IV. Computing Device Architecture

Figure 3:
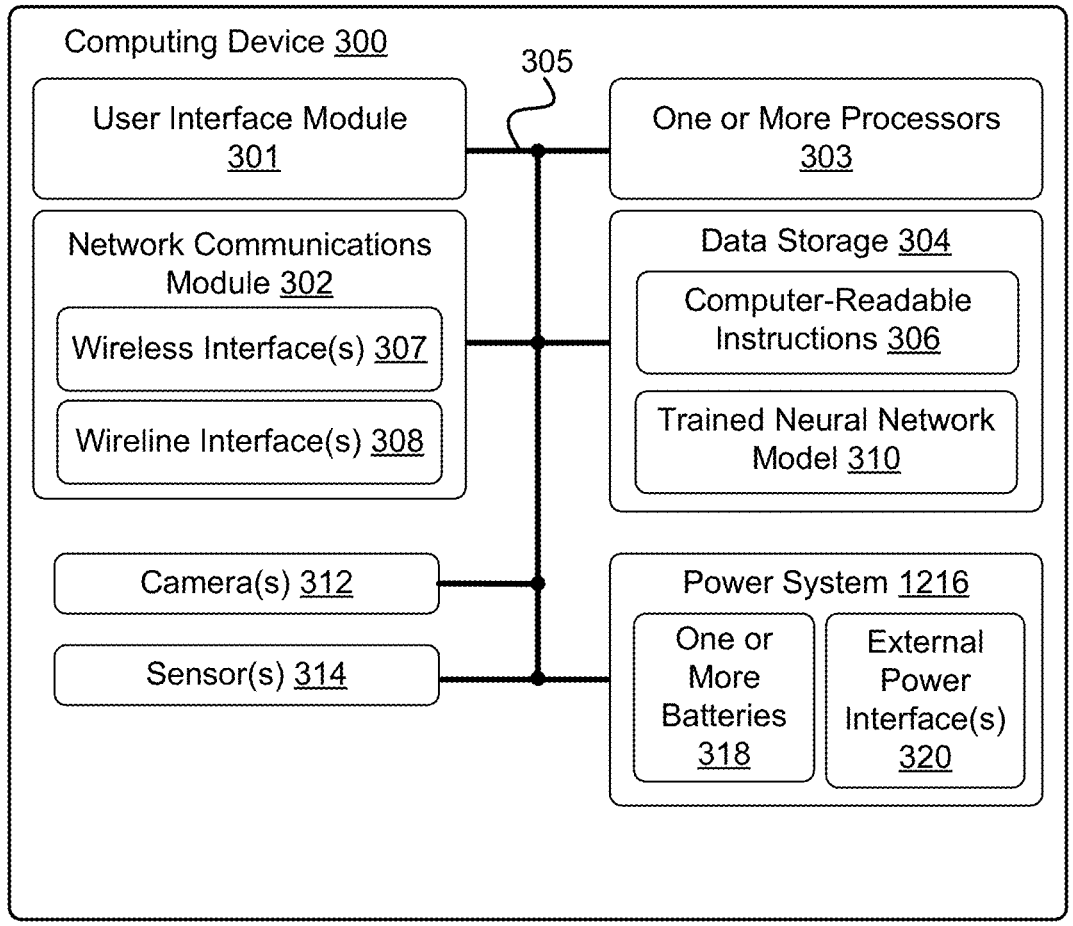
FIG. 3 is a block diagram of a computing device, in accordance with example embodiments.

FIG. 3 is a block diagram of an example computing device 300, in accordance with example embodiments. In particular, computing device 300 shown in FIG. 3 can be configured to perform at least one function of and/or related to training of a machine learning model by dynamically balancing the training across multiple training tasks, and/or method 500.

Computing device 300 may include a user interface module 301, a network communications module 302, one or more processors 303, data storage 304, one or more camera(s) 312, one or more sensors 314, and power system 316, all of which may be linked together via a system bus, network, or other connection mechanism 305.

User interface module 301 can be operable to send data to and/or receive data from external user input/output devices. For example, user interface module 301 can be configured to send and/or receive data to and/or from user input devices such as a touch screen, a computer mouse, a keyboard, a keypad, a touch pad, a track ball, a joystick, a voice recognition module, and/or other similar devices. User interface module 301 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 301 can also be configured to generate audible outputs, with devices such as a speaker, speaker jack, audio output port, audio output device, earphones, and/or other similar devices. User interface module 301 can further be configured with one or more haptic devices that can generate haptic outputs, such as vibrations and/or other outputs detectable by touch and/or physical contact with computing device 300. In some examples, user interface module 301 can be used to provide a graphical user interface (GUI) for utilizing computing device 300, such as, for example, a graphical user interface of a mobile phone device.

Network communications module 302 can include one or more devices that provide one or more wireless interface(s) 307 and/or one or more wireline interface(s) 308 that are configurable to communicate via a network. Wireless interface(s) 307 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 308 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 302 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 303 can include one or more general purpose processors, and/or one or more special purpose processors (e.g., digital signal processors, tensor processing units (TPUs), graphics processing units (GPUs), application specific integrated circuits, etc.). One or more processors 303 can be configured to execute computer-readable instructions 306 that are contained in data storage 304 and/or other instructions as described herein.

Data storage 304 can include one or more non-transitory computer-readable storage media that can be read and/or accessed by at least one of one or more processors 303. The one or more computer-readable storage media can include volatile and/or non-volatile storage components, such as optical, magnetic, organic or other memory or disc storage, which can be integrated in whole or in part with at least one of one or more processors 303. In some examples, data storage 304 can be implemented using a single physical device (e.g., one optical, magnetic, organic or other memory or disc storage unit), while in other examples, data storage 304 can be implemented using two or more physical devices.

Data storage 304 can include computer-readable instructions 1106 and perhaps additional data. In some examples, data storage 304 can include storage required to perform at least part of the herein-described methods, scenarios, and techniques and/or at least part of the functionality of the herein-described devices and networks. In some examples, data storage 304 can include storage for a trained neural network model 310 (e.g., a model of trained neural networks such as a cross-modal model, which may be or have been trained according to the methods described herein). In particular of these examples, computer-readable instructions 306 can include instructions that, when executed by one or more processors 303, enable computing device 300 to provide for some or all of the functionality of trained neural network model 310.

In some examples, computing device 300 can include one or more camera(s) 312. Camera(s) 312 can include one or more image capture devices, such as still and/or video cameras, equipped to capture light and record the captured light in one or more images; that is, camera(s) 312 can generate image(s) of captured light. The one or more images can be one or more still images and/or one or more images utilized in video imagery. Camera(s) 312 can capture light and/or electromagnetic radiation emitted as visible light, infrared radiation, ultraviolet light, and/or as one or more other frequencies of light.

In some examples, computing device 300 can include one or more sensors 314. Sensors 314 can be configured to measure conditions within computing device 300 and/or conditions in an environment of computing device 300 and provide data about these conditions. For example, sensors 314 can include one or more of: (i) sensors for obtaining data about computing device 300, such as, but not limited to, a thermometer for measuring a temperature of computing device 300, a battery sensor for measuring power of one or more batteries of power system 316, and/or other sensors measuring conditions of computing device 300; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 300, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 300, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 300, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 314 are possible as well.

Power system 316 can include one or more batteries 318 and/or one or more external power interfaces 320 for providing electrical power to computing device 300. Each battery of the one or more batteries 318 can, when electrically coupled to the computing device 300, act as a source of stored electrical power for computing device 300. One or more batteries 318 of power system 316 can be configured to be portable. Some or all of one or more batteries 318 can be readily removable from computing device 300. In other examples, some or all of one or more batteries 318 can be internal to computing device 300, and so may not be readily removable from computing device 300. Some or all of one or more batteries 318 can be rechargeable. For example, a rechargeable battery can be recharged via a wired connection between the battery and another power supply, such as by one or more power supplies that are external to computing device 300 and connected to computing device 300 via the one or more external power interfaces. In other examples, some or all of one or more batteries 318 can be non-rechargeable batteries.

One or more external power interfaces 320 of power system 316 can include one or more wired-power interfaces, such as a USB cable and/or a power cord, that enable wired electrical power connections to one or more power supplies that are external to computing device 300. One or more external power interfaces 320 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 320, computing device 300 can draw electrical power from the external power source the established electrical power connection. In some examples, power system 316 can include related sensors, such as battery sensors associated with the one or more batteries or other types of electrical power sensors.

V. Cloud-Based Servers

Figure 4:
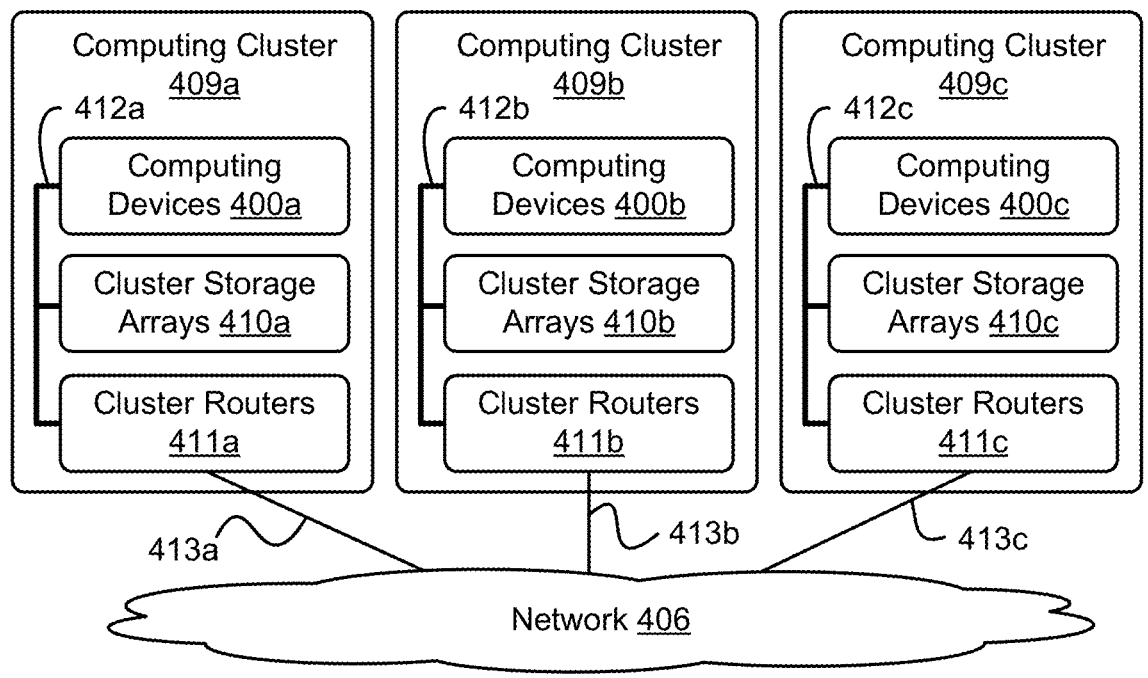
FIG. 4 depicts a network of computing clusters arranged as a cloud-based server system, in accordance with example embodiments.

FIG. 4 depicts a cloud-based server system in accordance with an example embodiment. In FIG. 4, functionality of executing and or training a cross-model machine learning model or other machine learning model, training of such a model by dynamically balancing amongst a number of different training tasks as described elsewhere herein, and/or a computing device can be distributed among computing clusters 409a, 409b, 409c. Computing cluster 409a can include one or more computing devices 400a, cluster storage arrays 410a, and cluster routers 411a connected by a local cluster network 412a. Similarly, computing cluster 409b can include one or more computing devices 400b, cluster storage arrays 410b, and cluster routers 411b connected by a local cluster network 412b. Likewise, computing cluster 409c can include one or more computing devices 400c, cluster storage arrays 410c, and cluster routers 411c connected by a local cluster network 412c.

In some embodiments, computing clusters 409a, 409b, 409c can be a single computing device residing in a single computing center. In other embodiments, computing clusters 409a, 409b, 409c can include multiple computing devices in a single computing center, or even multiple computing devices located in multiple computing centers located in diverse geographic locations. For example, FIG. 4 depicts each of computing clusters 409a, 409b, 409c residing in different physical locations.

In some embodiments, data and services at computing clusters 409a, 409b, 409c can be encoded as computer readable information stored in non-transitory, tangible computer readable media (or computer readable storage media) and accessible by other computing devices. In some embodiments, computing clusters 409a, 409b, 409c can be stored on a single disk drive or other tangible storage media, or can be implemented on multiple disk drives or other tangible storage media located at one or more diverse geographic locations.

In some embodiments, each of computing clusters 409a, 409b, and 409c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 409a, for example, computing devices 400a can be configured to perform various computing tasks of a cross-modal or other variety of machine learning model, and/or a computing device. In one embodiment, the various functionalities of a neural network, and/or a computing device can be distributed among one or more of computing devices 400a, 400b, 400c. Computing devices 400b and 400c in respective computing clusters 409b and 409c can be configured similarly to computing devices 400a in computing cluster 409a. On the other hand, in some embodiments, computing devices 400a, 400b, and 400c can be configured to perform different functions.

In some embodiments, computing tasks and stored data associated with a neural network, and/or a computing device can be distributed across computing devices 400a, 400b, and 400c based at least in part on the processing requirements of a neural network, and/or a computing device, the processing capabilities of computing devices 400a, 400b, 400c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 410a, 410b, 410c of computing clusters 409a, 409b, 409c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a machine learning model, and/or a computing device can be distributed across computing devices 400a, 400b, 400c of computing clusters 409a, 409b, 409c, various active portions and/or backup portions of these components can be distributed across cluster storage arrays 410a, 410b, 410c. For example, some cluster storage arrays can be configured to store one portion of the data of a first layer of a neural network, and/or a computing device, while other cluster storage arrays can store other portion(s) of data of second layer of a neural network, and/or a computing device. Also, for example, some cluster storage arrays can be configured to store the data of an encoder of a neural network, while other cluster storage arrays can store the data of a decoder of a neural network. Additionally, some cluster storage arrays can be configured to store backup versions of data stored in other cluster storage arrays.

Cluster routers 411a, 411b, 411c in computing clusters 409a, 409b, 409c can include networking equipment configured to provide internal and external communications for the computing clusters. For example, cluster routers 411a in computing cluster 409a can include one or more internet switching and routing devices configured to provide (i) local area network communications between computing devices 400a and cluster storage arrays 410a via local cluster network 412a, and (ii) wide area network communications between computing cluster 409a and computing clusters 409b and 409c via wide area network link 413a to network 406. Cluster routers 411b and 411c can include network equipment similar to cluster routers 411a, and cluster routers 411b and 411c can perform similar networking functions for computing clusters 409b and 409b that cluster routers 411a perform for computing cluster 409a.

In some embodiments, the configuration of cluster routers 411a, 411b, 411c can be based at least in part on the data communication requirements of the computing devices and cluster storage arrays, the data communications capabilities of the network equipment in cluster routers 411a, 411b, 411c, the latency and throughput of local cluster networks 412a, 412b, 412c, the latency, throughput, and cost of wide area network links 413a, 413b, 413c, and/or other factors that can contribute to the cost, speed, fault-tolerance, resiliency, efficiency and/or other design criteria of the moderation system architecture.

VI. Example Methods of Operation

FIG. 5 is a flowchart of a method 500, in accordance with example embodiments. Method 500 can be executed by a computing device, such as computing device 300. Method 500 includes obtaining a training dataset that includes a plurality of training examples and that represents at least two different training tasks, wherein each training example corresponds to a respective training task (510). Method 500 also includes selecting, from the training examples of the training dataset, a first training batch that includes at least one training example corresponding to each of the training tasks (520). Method 500 also includes applying the first training batch to train a machine learning model, wherein applying the first training batch to train the machine learning model comprises determining a sample loss of the model with respect to each training example in the first training batch (530). Method 500 also includes determining a per-task loss for each of the training tasks, wherein determining the per-task loss for a particular training task comprises determining the sample loss for the particular training task based on the determined sample losses for each of the training examples in the first training batch that correspond to the particular training task (540). Method 500 also includes selecting, from the training examples of the training dataset, a second training batch for training the machine learning model, wherein the second training batch includes at least one training example corresponding to each of the training tasks and such that training tasks having higher per-task losses are represented by more training examples in the second training batch (550). Method 500 can include additional or alternative steps or features.

VII. Example Embodiments and Experimental Results

Vision-Language pretraining aims to learn universal cross-modal representations and to create models with broad capabilities. Various embodiments described herein include dynamic pretraining resampling for a variety of pretraining tasks. Unlike recent alternative large-scale vision-language approaches, a set of diverse self- and weakly-supervised pretraining tasks dynamically sampled according to task difficulty as described herein provides strong performance. Further, the approach described herein is sample-efficient, using much less data and compute to address a range of downstream tasks. A single 330M pretrained model using only smaller and publicly accessible datasets, achieves competitive or SOTA performance on three diverse groups of tasks: visual question answering, text-based image localization by referring expressions, and video question answering.

The goal of vision-language pretraining is to learn universal cross-modal representations which are applicable to a wide range of downstream tasks. Vision-language models are typically pretrained on very large, sometimes inaccessible, datasets. Embodiments described herein improve the pretraining of such models by leveraging existing publicly-available datasets and tasks in more effective ways, showing improvements across a variety of vision-language tasks.

In order to achieve strong visual understanding, awareness of objects and interactions within the visual input is important. Often, useful pretraining tasks are not even considered in the pretraining mix, rather they are subsumed by training on a single large; very few of the current generic pretraining tasks are specifically aware of the objects present in the images. At the same time, diverse downstream tasks can be improved by use of diverse model training pathways and data associations during training, e.g., to optimize localization capabilities of the model. In some cases, off-the-shelf detectors are used to create object-based representations, however such an approach may be brittle as it inherits the limitations and blind spots of the detector. Embodiments described herein are able to leverage all supervision sources in the available pretraining mixtures. Specifically, pretraining tasks from the full spectrum of self-supervised, weakly-supervised (from image-text pairs) and supervised tasks can be applied according to the embodiments described herein.

Incorporating more than one task or dataset can improve the downstream performance, e.g., tasks like MLM (Masked Language Modeling) and ITM (Image-Text Matching) objectives that may be from multiple datasets. Prior approaches have struggled to leverage different pretraining mechanisms and to mix all these tasks together. With the increasing number of tasks and datasets, the number of pretraining objectives can grow quickly. Standard hyperparameter methods, such as grid search, are computationally expensive when dealing with big data and big models. Prior approaches have generated such training mixtures in an adhoc, manually effort-intensive manner. Naive solutions, such as uniform sampling, or sampling based on dataset size, are not optimal. Instead, the embodiments described herein provide improvements by including dynamic difficulty sampling, which dynamically updates the sampling weights based on a task's current difficulty, which was found to highly correlate to downstream task performance and to outperform alternatives even with smaller task mixtures.

The embodiments described herein were assessed on three sets of diverse tasks: image-language, video and localization (specifically, Visual Question and Answering (VQA)), Video Question and Answering (VideoQA), and referring expressions comprehension. A single pretrained model of 330M parameters was used, based on a mix of image-text pretraining tasks and the dynamic difficulty sampling which evolves with training. This avoids computationally hungry hyperparameter tuning, as well as demanding video pretraining. The box prediction localization downstream tasks use a boxes-as-text representation, which is also harder than prior methods, but has the advantage of a seamless model without additional task-specific heads. Such pretraining is also beneficial as it is not reserved for the large-datalarge-model setting, e.g., using billions of image-language pairs or large models, which might be unattainable by many researchers. With pretraining embodiments described herein, competitive or SOTA results were obtained on multiple tasks (FIG. 6), in many cases outperforming larger models or models trained on much more data, by only pretraining on relatively small datasets. The model described herein has low computational cost, taking fewer computational resources and less time to train.

Figure 6:
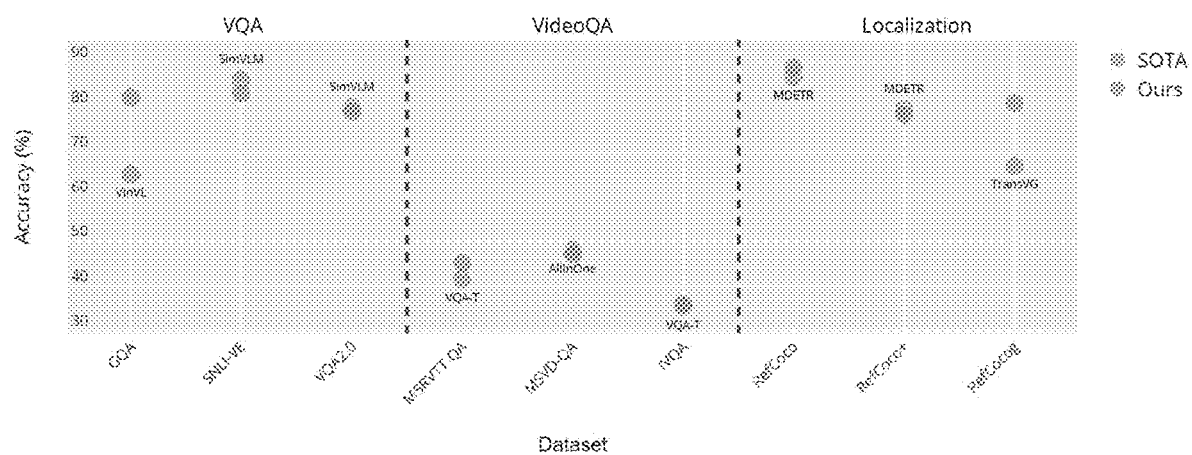
FIG. 6 shows experimental results, in accordance with example embodiments.
Figure 7:
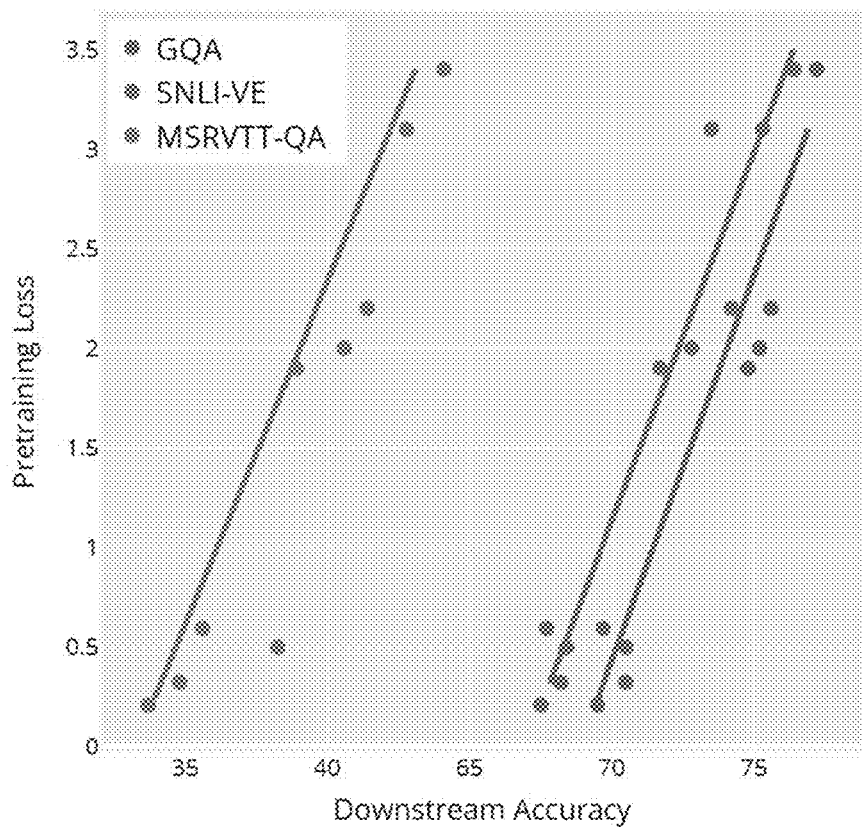
FIG. 7 shows experimental results, in accordance with example embodiments.

FIG. 6 depicts the performance of the embodiments described herein ("Ours"), which employ dynamic difficulty sampling, compared to the 'state of the art' methods ("SOTA"), on three categories of tasks: VQA, VideoQA, and referring expressions comprehension (object localization). The same pretrained model, obtained by the methods described herein, was used for all tasks including localization and video tasks.

The embodiments described herein provide a variety of benefits, including but not limited to:
1) Vision-language pretraining that relies on multiple tasks, which can be self-, weakly- or supervised tasks, to permit a more label-efficient use of data. The approach described herein uses smaller but more diverse datasets as opposed to larger and less accessible ones.
2) A dynamic difficulty sampling method that dynamically updates the pretraining mix, which was observed to further reduce the number of training steps while achieving similar performance. This approach avoids costly evaluation of downstream tasks during training, and is applicable to other model architectures.
3) Improved results on a wider variety of tasks, showing SOTA performances on VQA, referring expressions comprehension, and VideoQA, using open-vocabulary and boxes-as-text representations. This was achieved without having to pretrain specifically for these different tasks, including for video tasks.

Models obtained using the methods described herein are more practically relevant that prior alternatives, as they go beyond classification-centered questions. The same model is able to perform more challenging tasks such as VQA, object localization, and Video Question Answering, all in a text-generative setting, which does not restrict the output vocabulary.

Pretraining Mixture Learning

The training and model embodiments described herein can leverage diverse vision-language pretraining tasks with various sources of supervision. These embodiments employ dynamic sampling of the pretraining tasks during training. This avoids the many iterations of training that are needed to tune the sampling according to alternative methods, which often requires further fine-tuning to evaluate each proposed mixture of tasks. Such a process is very time and compute intensive, whereas the methods described herein are far more efficient.

Pretraining Objectives and Tasks

The embodiments described herein leverage diverse pretraining tasks to serve a variety of downstream tasks. In contrast with prior methods, which generally focus on a single large dataset (e.g., SimVLM), the embodiments described herein employ a diverse set of tasks and datasets, combining self-supervised, weakly-supervised, and fully-supervised signals. The tasks employed were diverse in two dimensions: 1) the amount of supervision and accompanying noise, and 2) the task the model is trying to solve, with different tasks exercising different parts of the model.

The most important tasks for vision-language learning are cross-modal tasks which leverage the (sometimes loose) correlation between pairs of images and text. For these, Image-Text Matching (ITM) and variations of Masked Language Modeling (MLM) were considered. Specifically, MLM (20% of random text masked out), Captioning (Cap) (all text masked out), and Caption Completion (CMP) (second half of text masked out) were used. Note that these tasks are typically done with weakly supervised data, such as image-text pairs from the internet. There are many more opportunities for self-supervised learning both for image and text.

Additional tasks were constructed using labeled object-specific information (e.g., image-level or localization class labels). These tasks were designed to teach the model different aspects of image-text and object data, especially in the case of non-exhaustively annotated objects. These tasks included tasks having inputs/outputs of the type:

| | |
|---|---|
| 1) Input: 'List all objects' | Output: '[obj1], [obj2], . . .' |
| 2) Input: 'Does [object] exist?' | Output: Yes/No |
| 3) Input: 'Does [obj1], [obj2] and/ or [obj3] exist?' | Output: Yes/No |
| 4) Input: 'Which of [obj1], [obj2] and [obj3] exist?' | Output: [obj1], [obj2]. |

These tasks exercise the model in different ways. For example, listing all the objects requires the model's decoder to generate the names for all the objects, however, since the image has some objects which are not annotated, this task can be quite difficult for the model. The object existence task tests the model's language encoder and ability to find the object in the image, but does not make the decoder learn object names. The multiple object existence task forces the model to learn more subtle language meanings, such as, the difference between 'and' and 'or', and the ability to find a set of objects. Finally, the last task makes the model output the names of the objects present in the image, but only from those specified in the input. This is similar to the 'list objects' task, but will not penalize the model for non-annotated objects as the first task does.

Note that these tasks use the labeled data differently than traditional classification tasks. Rather than training a classification model, a language model is used to generate the object names. Experimentally, this was found to be better than training only the vision model with classification data.

Dynamic Difficulty Sampling

Another benefit of the embodiments described herein is the generation of effective mixtures of pretraining tasks, without having to train and evaluate the many combinations of tasks, as such an evaluation is generally computationally impractical.

Consider a set of pretraining tasks $t \in T$, for example, captioning, caption completion, or others. For each of these tasks, there is an associated loss, $L_t$, which is computed for some batch of data. The final loss for a mixture of tasks, $M = t_1, t_2, \ldots t_n$ is computed as $L_M$=the sum over all t in M of $L_t$, i.e., the sum of the individual task losses. In this work, the loss terms are equally weighted, with the dynamic sampling instead focused on weighting the number of samples in a batch.

When a task has a higher loss, it is currently harder for the model to solve. Thus, one aspect of the approach represented in the embodiments described herein is to sample tasks with higher losses to a greater degree. Further, in the context of visual-language learning, it was observed that for two mixtures of tasks, $M_1$ and $M_2$, if $L_{M1} > L_{M2}$, then the accuracy of the model fine-tuned on a VQA task from $M_1$ is greater than $M_2$. FIG. 6 depicts a plot of the cross-entropy loss and downstream performance for a variety of tasks, confirming this observation. This may be due to the fact that, when the pre-training loss is higher (after sufficient training), the tasks are harder or more diverse and the model is able to learn more from those tasks. For example, a yes/no task is easy for the model to learn and does not provide as many learning signals as an open-vocab captioning task. By sampling in this way, the embodiments described herein avoid training and evaluating an exponential number of combinations of pretraining tasks.

FIG. 6 depicts the difficulty (pretraining loss) vs downstream task accuracy, illustrating their correlation.

The dynamic difficulty sampling method represented by the embodiments described herein can be described as follows. For each task and dataset in the training mixture ($t \in T$), the loss for each task on a batch from the training set, $L_t$, is computed. The total loss is then computed as the sum of all tasks: L=the sum over all t in T of $L_t$. Then, in order to construct the next batch, the sample size of each task is re-weighted as:

$$S_t = \frac{L_t}{L}. \quad (1)$$

Here $S_t$ is the percent of the batch used for task t. A minimum of 4 samples per-batch was enforced for each task, ensuring that the difficulty of each task for the subsequent iterations can always be accurately computed. Note that such a minimum could be more or fewer (e.g., only a single sample per-batch the ensure that some information is available to compute task difficulty for each iteration, even if such a computation may exhibit greater noise or variability). For stability, we the losses were accumulated over K steps (here K=100), before another resampling is iteratively performed. Algorithm 1 summarizes some key steps of the dynamic difficulty sampling.

ALGORITHM 1

Dynamic resampling pretraining algorithm

M - model
D - mixture of datasets, $S_D$ - current sample/batch
$\mathcal{L}_t$ - loss for task t
for s = 1 to Iterations do
   for k = 1 to K (accumulation steps) do
      M, $\mathcal{L}_{k,t}$ ← train(M, $S_D$) ▷Train with current mix $S_D$, accumulate per-task loss.
   end for
   $\mathcal{L}_t$ ← $\Sigma_k \mathcal{L}_{k,t}$▷Measure performance (losses) of pretraining tasks for last K steps.
   $S_D$ ← D ~ (D, $\mathcal{L}_t$)▷ Resample the data according to task difficulty, Eq. 1.
     ▷ The next iteration of training (i.e., the next K steps) will be trained with the new mixture weights,
end for Note that this method has very little computation overhead, especially compared to methods like DSG which requires the use of a validation set.

Also note that, in the early stages of training, the method described herein samples tasks more or less uniformly, and starts to sample difficult tasks more with progression of training.

The pretraining tasks were selected so that they were likely helpful to the visual-language understanding at hand (by design), so tasks that were unnecessarily difficult, irrelevant, or harmful were not included.

With all the above-mentioned tasks, the same training objective was applied, e.g., per-token cross-entropy loss, summed over all tasks. Note that while, in the examples above, the same loss was used for all tasks, the embodiments described herein do not require this; any set of tasks and losses can be used. Note that different losses (e.g., $L_2$) may have different ranges, and so may have applied thereto normalization before resampling.

A simple model (of 330M params) was used to assess the embodiments described herein, as the focus was on pretraining. This model was a standard encoder-decoder—ResNet-50 to extract images features from input images, a T5 encoder for input text, and a T5 decoder to generate the answer text. The image and text features were concatenated before decoding. The model was trained from scratch, using public image+text datasets; the same pre-trained model was used for fine-tuning all tasks described herein, including video and localization tasks.

Datasets

The ability to leverage diverse sources of supervision in the pretraining allows the embodiments described herein to use a much smaller amount of data. Specifically, only 39M images were used, as opposed to other works, which used hundreds of millions, or 1-2 billion images. With the pretraining methods described herein, the embodiments described herein are competitive with large-data and large-model approaches, despite using small datasets. The datasets are also publicly available and well known in the literature. Specifically, the Conceptual Captions 3M and 12M datasets, abbreviated as CC3+12M, ImageNet21k (IN), Visual Genome (VG), and Open Images (OI) with text annotations provided by the Localized Narratives (LN) dataset (these annotations were only used for OI). Note any images used in these training sets were removed from the downstream validation/tests.

Specific training was not performed for videos or localization, yet models generated via the training methods described herein provided competitive results for both.

Experiments

A single model was pre-trained then applied to three diverse sets of tasks (image-language, object localization, and video-language), some of which were outside the initial domain of the pretraining tasks. Specifically, results are reported herein for the VQA datasets GQA, VQA2.0, and visual entailment (SNLI-VE), on VideoQA datasets MSRVTTQA, MSVD-QA, and IVQA, and on object localization tasks with referring expressions RefCOCO, RefCOCO+, and RefCOCOg. For each of the datasets the evaluation metrics and protocols established in prior work were applied.

TABLE 1 depicts performance on image VQA datasets. The present model trained via the methods described herein outperformed roughly comparable SOTA models, even though the SOTA models used much larger pre-training datasets (e.g. BLIP-L used 129M, METER used CLIP pretrained on 400 M image-text pairs, etc). The present model was only 0.17 points away on VQA2.0 from SimVLM-huge (1.5 B params with 1.8 B dataset) although the present model generated open-vocabulary outptus. Additoinally, the present model used very few GFLOPs (GF) (GF measured or obtained from authors).

| | GF | Data | Params | GQA | SNLI-VE | VQA2.0 |
|---|---|---|---|---|---|---|
| Sim VLM-buge* (Wang et al., 2021) | 900 | 1.8 B | 1.5 B | — | 86.21 | 80.03 |
| UNITER (Chen et al., 2020) | — | — | — | — | 79.39 | 72.5 |
| 12-in-1 (Lu et al., 2020) | — | | | 60.5 | — | 71.3 |
| VinVL (Zhang et al., 2021) | — | | | 65.05 | — | 76.52 |
| CFR (Nguyen et al., 2022) | | | | 73.6 | — | 69.8 |
| FLAVA (Singh et al.) | 70 | 70M | 240M | — | 78.9 | 72.5 |
| METER-CLIP-VIT-B (Dou et al., 2022) | 130 | 400M | 330M | — | 80.86 | 77.68 |
| ALBEF (Li et al., 2021) | 160 | 4M | 418M | — | 80.30 | 74.54 |
| ALBEF (Li et al., 2021) | 160 | 14M | 418M | — | 80.80 | 75.84 |
| BLIP (Li et al., 2022) | 122 | 14M | 475M | — | — | 77.54 |
| BLIP-L (Li et al., 2022) | 250 | 129M | 475M | — | — | 78.25 |

TABLE 1-continued depicts performance on image VQA datasets. The present model trained via
the methods described herein outperformed roughly comparable SOTA models, even though the
SOTA models used much larger pre-training datasets (e.g. BLIP-L used 129M, METER used CLIP
pretrained on 400 M image-text pairs, etc). The present model was only 0.17 points away on
VQA2.0 from SimVLM-huge (1.5 B params with 1.8 B dataset) although the present model
generated open-vocabulary outptus. Additoinally, the present model used very few GFLOPs (GF)
(GF measured or obtained from authors).

|  | GF | Data | Params | GQA | SNLI-VE | VQA2.0 |
|---|---|---|---|---|---|---|
| Ours (14 M data) | 54 | 14M | 330M | 80.7 | 81.0 | 78.43 |
| Ours (39 M data) | 54 | 39M | 330M | 81.3 | 82.5 | 79.86 |

To create a pretraining mix, two groups of tasks were defined over the datasets. For Localized Narratives, CC12m and CC3m, 4 cross-modal image-text tasks were used: Captioning (Cap), Caption completion (CMP), Image-Text Matching (ITM) and Masked Language Modeling (MEM). For OpenImages, ImageNet21k and Visual Genome 4 object aware tasks were used. Note that while some of these datasets have bounding box labels, those were discarded for this work, using only class names. This results in a total of 3·4+3·4=24 tasks by mixing together all these datasets and tasks. This approach is extendable to other tasks and datasets.

Visual Question and Answering

Table 1 reports the results on VQA datasets. As seen, the pretraining approach described herein outperforms SOTA on the three VQA datasets, with the exception of SimVLM which is a very large model. The comparison model according to the embodments described herein is small (330M parameters) and uses only 39M examples; despite these limitations, it is within only 0.2 points of SimVLM on VQA2.0 (SimVLM being trained on 1.8B examples). The model was pretrained for 500k steps.

Video Question and Answering

The performance of the pretraining methods described herein were also assessed on VideoQA tasks. The same 330M-parameter model, which provided pretraining for the VQA tasks above, was used for videos. The ResNet model was applied per-frame, then the frames' outputs were concatenated together to form the visual feature for the video. As seen, the pretraining described herein yields strong models for video, outperforming SOTA on all three datasets tested (these results shown in Table 2). This performance was obtained despite using image-only pretraining, which uses fewer images than e.g. the video pretraining of VQA-T, which uses 100M or 69M video snippets, or of MERLOT, which uses 180M videos.

TABLE 2

Results on VideoQA (video + text) datasets MSRVTT-
QA, MSVD-QA, and IVQA. Accuracy (%). Note that VQA-T
uses a much larger video pretraining dataset of 100M
examples, whereas a smaller 39M example image-only
dataset was used to train the models described herein.

| Model | MSRVTT-QA | MSVD-QA | IVQA |
|---|---|---|---|
| HCRN (Le et al., 2020) | 36.1 | 35.6 | — |
| ClipBERT* (Lei et al., 2021) 8 × 2, image-only pretraining | 37.4 | — | — |
| VQA-T (Yang et al., 2021), pretr. HowToVQA69M | 41.5 | 46.3 | 35.4 |
| MERLOT (Zellers et al., 2021), pretr. YT180M | 43.1 | — | — |
| AllInOne (Wang et al., 2022), pretr. YT180M, HowTo100M | 44.3 | 47.9 | — |
| Ours, image-only pretraining | 45.1 | 47.1 | 35.8 |

Object Localization with Referring Expressions Comprehension

The embodiments described herein were also evaluated on three datasets of the Referring Expressions comprehension task. In this task, text describing an object in an image is given and the model needs to output the bounding box for the described object. This is an object localization task, for which the pretrained model was not explicitly trained. To accomplish this task using the generative text API of the embodiments described herein, the pix2seq approach was used where box coordinates are tokenized and treated as text.

Our results on this challenging task with boxes represented as text during training, also achieves SOTA or better than SOTA results (see Table 3), compared to UNITER, VILLA, MDETR, etc. Note that the RefCoco benchmarks were evaluated using more than 30 approaches; only the best are listed here.

TABLE 3

Experiments on localizing objects in the image by referring expressions.
Without using any pretraining localization labels or localization components (e.g., box proposals
or regression heads), the models and training methods described herein provided competitive
performance relative to previous models. With the exception of the top row of Table 3 and the
model described herein, all other models used the stronger backbone ResNet-101. MDETR used
additional label supervision during training.

|  | RefCOCO | | | RefCOCO+ | | | RefCOCOg | |
|---|---|---|---|---|---|---|---|---|
|  | val | testA | testB | val | testA | testB | val | test |
| Trans VG (Deng et al., 2021) (R50) | 80.32 | 82.67 | 78.12 | 63.50 | 68.15 | 55.63 | 50.6 | — |
| Trans VG (Deng et al., 2021) (R101) | 81.02 | 82.72 | 78.35 | 64.82 | 70.70 | 56.94 | 67.02 | — |
| UNITER (Large) (R101) | 81.41 | 87.04 | 74.17 | 75.90 | 81.45 | 66.70 | 74.86 | 75.77 |
| VILLA (Large) (R101) | 82.39 | 87.48 | 74.84 | 76.17 | 81.54 | 66.84 | 76.18 | 76.71 |

TABLE 3-continued

Experiments on localizing objects in the image by referring expressions.
Without using any pretraining localization labels or localization components (e.g., box proposals or regression heads), the models and training methods described herein provided competitive performance relative to previous models. With the exception of the top row of Table 3 and the model described herein, all other models used the stronger backbone ResNet-101. MDETR used additional label supervision during training.

|  | RefCOCO | | | RefCOCO+ | | | RefCOCOg | |
| --- | --- | --- | --- | --- | --- | --- | --- | --- |
|  | val | testA | testB | val | testA | testB | val | test |
| MDETR* (R101) | 86.75 | 89.58 | 81.41 | 79.52 | 84.09 | 70.62 | 81.64 | 80.89 |
| Ours (R50) | 88.9 | 90.7 | 82.8 | 78.4 | 84.3 | 72.6 | 80.9 | 81.5 |

Data Sampling Methods and Pretraining Mixtures Ablations

Different methods of sampling the data were assessed. These methods were compared to a number of alternative approaches: uniform sampling, e.g., the batch is composed of BS/|T| samples from each task for |T| tasks, and dataset size based sampling. Multiple versions of the difficulty-based sampling were assessed. These included (1) the method of Eq. 1, and (2) sampling only the most difficult or the easiest task (with some minimum number of examples included from all tasks, so the difficulty of each can always be computed). Reweighting the loss, rather than changing the batch sampling, was also assessed and compared to the DSG algorithm proposed in Lu et al., 2020. The results are shown in Table 4, with the approach described herein outperforming the alternatives. Note that these models were only pretrained for 200k steps, while the final models were pretrained for 500k steps, both with BS=4k. Note that the method described herein outperforms both with fewer steps (demonstrating sample efficiency), as well as when fully trained (see FIG. 3), suggesting it is learning better as well, and that these results are not just an artifact of shorter pretraining.

TABLE 4

Ablating different sampling mechanisms for the tasks, including the popular round robin method. Mixtures of all tasks are used in each experiment. Experiments were conducted with only ⅖ of the steps used for other assessments described herein.

|  | GQA | SNLI-VE |
| --- | --- | --- |
| Easiest Task | 71.3 | 67.5 |
| Most Difficult | 74.2 | 76.4 |
| Uniform Sampling | 75.6 | 77.4 |
| Sampling by dataset size | 75.7 | 77.9 |
| Loss Reweighting | 75.9 | 77.5 |
| DSG Round Robin (from 12-in-1 (Lu et al., 2020)) | 76.4 | 77.8 |
| Dynamic Difficulty Sampling (ours) | 77.4 (+1.0) | 78.2 (+0.3) |

Using the dynamic difficulty sampling, the effects of adding more tasks were also assessed. The results are shown in Table 5. Note that across datasets, for both small and large numbers of tasks the difficulty sampling was beneficial, and with the proposed difficulty sampling, the performance improved as more tasks were added. Difficulty sampling for only 8 tasks tended to outperform uniform sampling for 24 tasks. Note also that, as more tasks were added with uniform sampling, the performance dropped.

TABLE 5

Comparison between uniform sampling and the difficulty-based sampling described herein, for an increasing number of pretraining task mixtures. Each entry shows the performance for a 'uniform sampling/difficulty sampling' pair on GQA and SNLI-VE. The improvement provided by difficulty-based sampling was consistent across all datasets and task mixtures. Note that using difficulty sampling even for 8 tasks often out performed the uniform sampling of 24 tasks (the latter also involving more datasets in the mix). A 330M model and only ⅖ of the steps (i.e. 200k steps) were used in this experiment.

|  | GQA | SNLI-VE |
| --- | --- | --- |
| 4 tasks | 75.4/76.1 | 76.1/76.7 |
| 8 tasks | 75.8/76.5 | 77.5/77.7 |
| 12 tasks | 75.9/76.9 | 77.7/77.9 |
| 16 tasks | 75.7/77.3 | 77.6/78.1 |
| 24 tasks | 75.6/77.4 (+1.8) | 77.4/78.2 (+0.8) |

Figure 8:
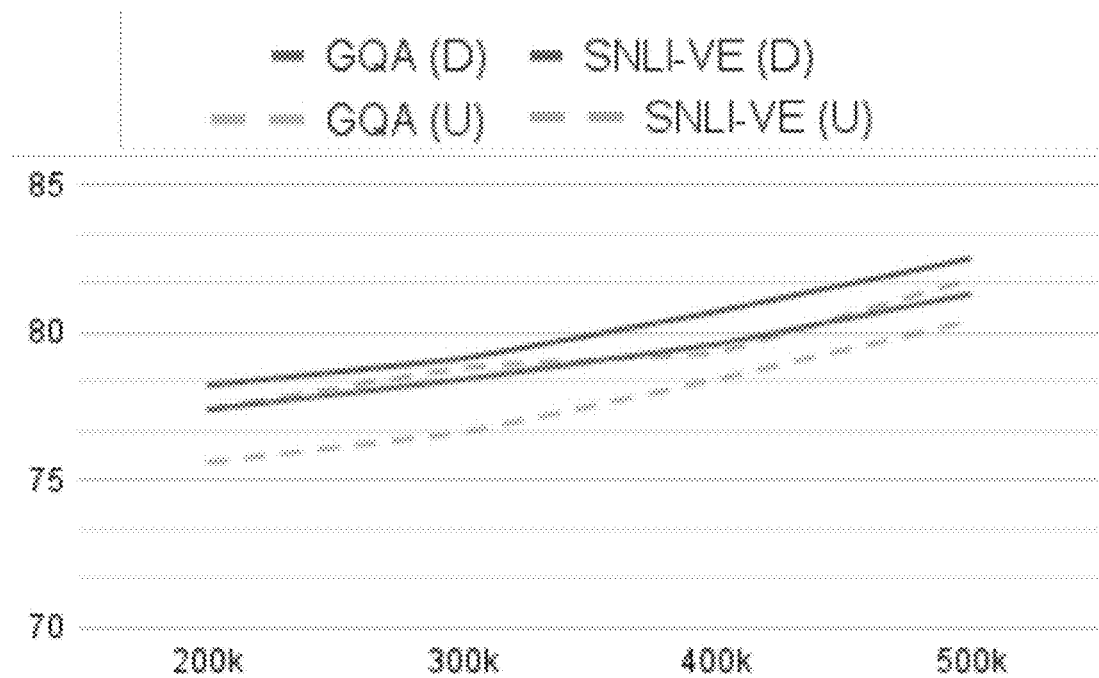
FIG. 8 shows experimental results, in accordance with example embodiments.

FIG. 8 further illustrates the performance for a number of steps of uniform sampling compared with difficulty-based sampling, illustrating that dynamic difficulty sampling continues to matter for larger numbers of steps. FIG. 8 depicts the performance of Uniform Sampling (U) and Difficulty Sampling (D) when pretrained for different numbers of steps then finetuned on VQA datasets. Even out to 500k steps (~52 epochs), difficulty sampling out-performed uniform sampling.

Figure 9:
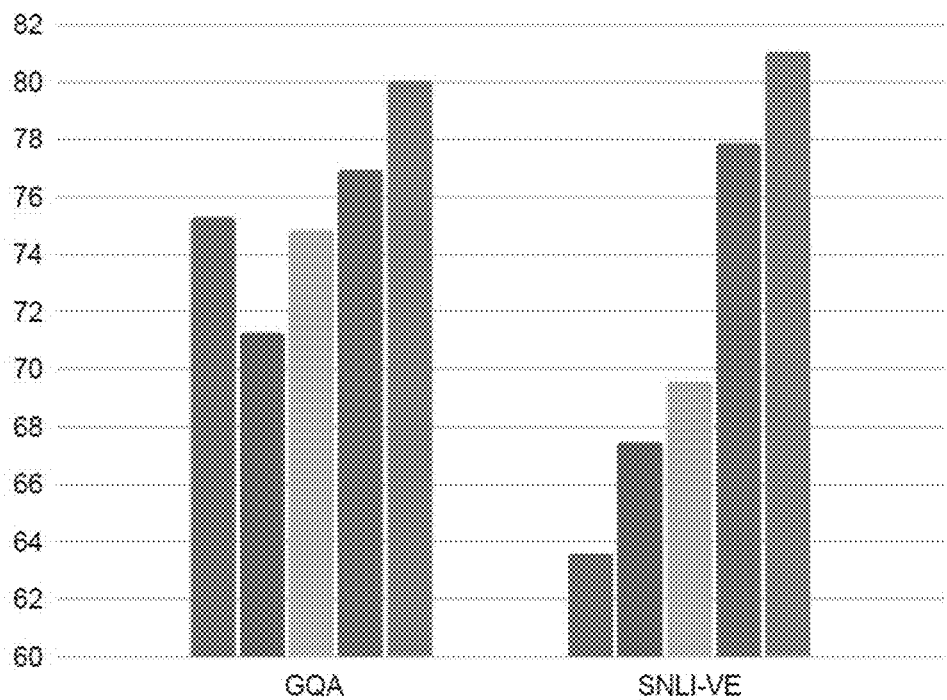
FIG. 9 shows experimental results, in accordance with example embodiments.

In FIG. 9, training on individual tasks was compared to mixtures. Note that while performance was variable for individual tasks, mixing with dynamic sampling of diverse tasks was beneficial.

Table 6 shows the effect of the approach described herein on localization tasks. As seen, the object-aware tasks were better than cross-modal tasks, confirming their ability to learn objects. However, the proposed pretraining using mixtures of tasks and dynamic difficulty sampling performed best.

TABLE 6

Experiments on RefCOCO datasets which require localization of objects referred by text. Note that combining Object Aware tasks was much more beneficial than only image-text pretraining tasks which are commonly used in large image-language models. Mixing many tasks with dynamic difficulty sampling performed the best, competitive with SOTA models on RefCOCO. SOTA results for RefCOCO/RefCOCO+ are from (Kamath et al., 2021), for RefCOCOg from (Deng et al., 2021).

|  | RefCOCO | RefCOCO+ | RefCOCOg |
| --- | --- | --- | --- |
| SOTA | 86.75 | 79.52 | 67.02 |
| No pretraining | 69.5 | 55.4 | 43.5 |
| Cross-Modal (4 tasks) | 73.7 | 59.7 | 48.7 |

TABLE 6-continued

Experiments on RefCOCO datasets which require localization of objects referred by text. Note that combining Object Aware tasks was much more beneficial than only image-text pretraining tasks which are commonly used in large image-language models. Mixing many tasks with dynamic difficulty sampling performed the best, competitive with SOTA models on RefCOCO. SOTA results for RefCOCO/RefCOCO+ are from (Kamath et al., 2021), for RefCOCOg from (Deng et al., 2021).

|  | RefCOCO | RefCOCO+ | RefCOCOg |
|---|---|---|---|
| Object Aware (4 tasks) | 75.9 | 62.4 | 50.6 |
| Difficulty Sampling (Ours, All 24 tasks) | 88.9 | 78.4 | 80.9 |

Table 7 demonstrates that using dynamic sampling also benefits other models, e.g., ViLT, showing that its benefits are not limited to the architecture chosen for the assessments herein.

TABLE 7

Dynamic difficulty sampling applied to an alternative model architecture, ViLT, showed consistent improvements as well.

|  | GQA | SNLI-VE |
|---|---|---|
| ViLT + Uniform Sampling | 74.6 | 77.1 |
| ViLT + Dynamic Difficulty Sampling (ours) | 77.2 | 77.9 |

Small-Sample Mixtures Ablations

Experiments were conducted on even smaller mixtures of pretraining tasks and a single dataset (OpenImages, ~9M samples). These assessments illustrated the ability of the approach described herein to efficiently leverage the available data during pretraining due to the mixture and dynamic difficulty sampling.

The following tasks were used for evaluation: 4 cross-modal tasks (using the text annotations for OI) and 4 Object Aware tasks on OI. Very competitive performance was observed when dynamic difficulty sampling was used, even in this smaller model and smaller data scenario (Table 8). The pretraining mixture of tasks can provide competitive results for even small-model, small-data scenarios.

TABLE 8

Performance of VQA tasks on pretraining mixtures from OpenImages-only (with 9M images) using the model described herein. The 4 tasks were the Cross-Modal tasks and the 8 were the Cross-Modal and Object Aware tasks. Even in this setting the approach described herein performed competitively relative to SOTA.

|  | GQA | SNLI-VE |
|---|---|---|
| SOTA | 65.5 (Zbang et al., 2021) | 86.2 (Wang et al., 2021) |
| Uniform Sampling - 4 tasks | 77.5 | 73.5 |
| Difficulty Sampling - 4 tasks (ours) | 76.2 | 79.2 |
| Uniform Sampling - 8 tasks | 76.4 | 80.0 |
| Difficulty Sampling - 8 tasks (ours) | 78.7 | 81.5 |

Model costs. The model pretraining methods described herein exhibit much lower computational cost than alternative methods, e.g., SOTA methods like SimVLM, which takes about 244,000 TPU hours (2,048 TPUs for 5 days) to train. The model described herein takes only 384 TPU hours (16 for 1 day, a 635× reduction) while still obtaining competitive performance. The pre-trained model described herein can also be used for downstream video-based tasks and object localization tasks, thus sharing those costs.

Visualizations

Figure 10:
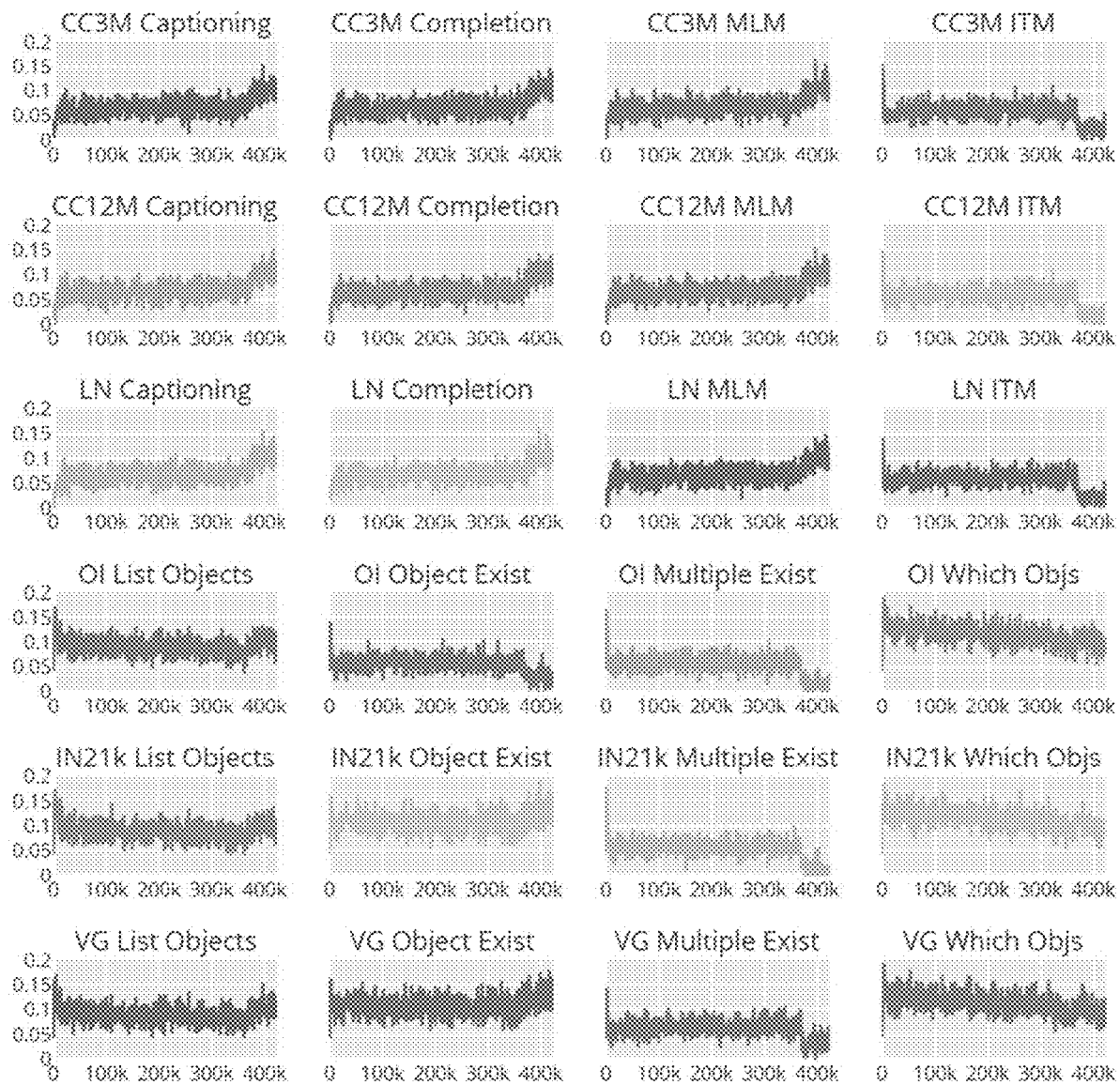
FIG. 10 shows experimental results, in accordance with example embodiments.

FIG. 10 depicts the sampling weights for the 24 tasks over the 500k training iterations. The y-axis is the percent of the batch of each task. Thus, the weights reflect how 'hard' the task is for the model to accomplish across training iterations. Some tasks that are 'easy' have weights that consistently decrease, e.g., ITM. ITM is likely an easy task for two reasons: (1) The outputs are only 'yes' or 'no' and (2) since ITM is accomplished by randomly picking alternative captions for the no case, it is often easy to solve the task. Other tasks increased over training iterations, e.g., MLM. Others, such as listing objects, decreased then increased. For example, 'List Objects' for ImageNet21k exhibited a small decrease for the first 300k steps, then began to increase.

Implementation Details

Model Details. The model assessed consisted of a ResNet-50 for the image encoder. The feature map from $conv_4$, which has shape of 14×14, was output as the visual feature. An image size of 224×224 was used for the input. For text, the T5-base model was used with the standard 32,000 token vocabulary. After the encoder layers, the 196 vision features were concatenated with the text features (using an input sequence length of 32). These are then used as the input to the decoder layers. 12 encoder and decoder layers were used with 768-dimensional representations, following the T5-base settings. All models were trained from scratch.

The final model was trained for 500k steps with a batch size of 4096. The loss was a per-token cross entropy loss over the 32,000 tokens from the vocabulary. The learning rate was set to 1e-4, using a linear warmup for the first 10,000 steps, followed by a cosine decay. The Adam optimizer was used with weight decay set to 0.1. Label smoothing was set to 0.1. The gradient norm was clipped to 1. For most ablations, pretraining was only performed for 200k steps, while the other settings were the same.

For finetuning on the image datasets, the same learning settings as above were used. The batch size was 256 for 200k steps. For the VideoQA datasets, a smaller learning rate of 1e-6, a batch size of 64, and 20,000 steps were used. For the RefCOCO tasks, a learning rate of 6e-4, with a batch size of 128 for 200k steps was used.

Training was performed using the standard training sets splits. For the pretraining, any images used in the validation and test sets were removed for the downstream VQA datasets. Evaluation was perfumed on the validation splits of the VQA datasets and the test splits for IVQA, MSRVTT-QA, and MSVD-QA.

For the RefCOCO tasks, the boxes were represented as text. The box was first represented as $[y_{max}, x_{max}, y_{min}, x_{min}]$, where each x and y are floats between 0 and 1, which are the coordinates of a box in the image normalized with respect to the image size. Following Pix2Seq, the normalized bounding boxes were converted to integers by quantizing them into 100 intervals. These integers were then converted into tokens by treating them as strings in the T5 text tokenizer. An end of sequence token was appended at the end of the box.

To convert a prediction into a box for evaluation, the process was reversed. The output tokens were converted into integers, the integer was mapped to a float by inverting the quantiziation step, then the box was constructed by un-normalizing the coordinates. Metrics were then computed using the standard RefCOOC evaluation code.

The model described herein used 16 TPUs for 1 day to complete the pretraining. When finetuning the model, 4 TPUs were used for 8 hours. Both image and video tasks used the same pretrained model so that cost was shared across tasks. The VideoQA fine-tuning took 4 TPUs for about 8 hours, as it used fewer steps.

For the pretraining tasks, 25% of the tokens were masked out for MLM. For the Caption Completion task, the last 20-60% of the tokens were masked out, with the exact portion taken at random per example.

Since the model described herein generates open-ended responses, the generated strings were compared to the ground truth strings for evaluation. This was a more challenging evaluation method since the model can generate close answers, e.g., 'oak trees' where a ground truth answer of 'tree' would be considered incorrect. For the VideoQA datasets, in order to compare directly with prior work, the answers that were outside the standard vocabulary were masked out.

Given the generated answer for a model, we use the standard evaluations for each dataset were applied. For SNLI-VE, GQA, VQA2.0, MSRVTT-QA, and MSVD-QA accuracy was used. For IVQA, the accuracy metric of min((#ground truth answers==a)/2, 1), since there were multiple annotations per question. For RefCOCO, the standard AP50 metric was used, which is the Average Precision with an IoU threshold of 0.5.

VIII. Enumerated Example Embodiments

Embodiments of the present disclosure may thus relate to one of the enumerated example embodiments (EEEs) listed below. It will be appreciated that features indicated with respect to one EEE can be combined with other EEEs.

EEE is a method for training a machine learning model, comprising: (i) obtaining a training dataset that includes a plurality of training examples and that represents at least two different training tasks, wherein each training example corresponds to a respective training task; (ii) selecting, from the training examples of the training dataset, a first training batch that includes at least one training example corresponding to each of the training tasks; (iii) applying the first training batch to train a machine learning model, wherein applying the first training batch to train the machine learning model comprises determining a sample loss of the model with respect to each training example in the first training batch; (iv) determining a per-task loss for each of the training tasks, wherein determining the per-task loss for a particular training task comprises determining the sample loss for the particular training task based on the determined sample losses for each of the training examples in the first training batch that correspond to the particular training task; and (v) selecting, from the training examples of the training dataset, a second training batch for training the machine learning model, wherein the second training batch includes at least one training example corresponding to each of the training tasks and such that training tasks having higher per-task losses are represented by more training examples in the second training batch.

EEE 2 is the method of EEE 1, wherein each training example includes at least an image or text data.

EEE 3 is the method of EEE 2, wherein the training tasks include at least one of visual question and answering, video question and answering, referring expressions, comprehension tasks, object localization, captioning, caption completion, image-text matching, or masked language modeling tasks.

EEE 4 is the method of EEE 2 or EEE 3, wherein the machine learning model receives as inputs at least one of an image or text and the model generates text as an output.

EEE 5 is the method of EEE 4, wherein at least one of the training tasks is object localization, and wherein the model generating output text comprises generating a textual representation of a location of a target object within a frame of an input image, and wherein the method further comprises: generating the training examples of the training dataset that correspond to the object localization training task by: (a) obtaining a set of raw training examples that include images and corresponding bounding boxes that define the location of objects of interest within the images; and (b) determining, for each image in the raw training examples, a textual representation of a location of a target object within a frame of a corresponding input image based on the corresponding bounding box.

EEE 6 is the method of EEE 4 or 5, wherein the model comprises a ResNet encoder configured to receive an image as an input, an encoder that comprises a transformer and that is configured to receive text as an input, a decoder the comprises a transformer and that is configured to generate text as an output, and an intermediate model that receives, as inputs, outputs from the encoders and that provides, as an output, an input to the decoder.

EEE 7 is the method of any preceding EEE, wherein determining the per-task loss for the particular training task comprises: (i) determining a total sample loss for all of the training examples of the first training batch; (ii) determining a total sample loss for all of the training examples in the first training batch that correspond to the particular training task; and (iii) determining a loss fraction for the particular training task by dividing the total sample loss for all of the training examples in the first training batch that correspond to the particular training task by the total sample loss for all of the training examples of the first training batch, wherein selecting the second training batch comprises selecting training examples of the training dataset such that training tasks having higher per-task loss fractions are represented by more training examples in the second training batch.

EEE 8 is the method of any preceding EEE, where determining a sample loss of the model with respect to each training example in the first training batch comprises determining a cross-entropy loss for each training example.

EEE 9 is the method of any of EEEs 1-7, where determining a sample loss of the model with respect to each training example in the first training batch that corresponds to a first training task comprises determining a first type of loss, wherein determining a loss of the model with respect to each training example in the first training batch that corresponds to a second training task comprises determining a second type of loss that differs from the first type of loss, and wherein the method further comprises: normalizing at least one of the types of loss of the model with respect to each training example in the first training batch that corresponds to the first training task or the sample loss of the model with respect to each training example in the first training batch that corresponds to the first training task.

EEE 10 is the method of any preceding EEE, wherein the machine learning model is a pre-trained machine learning model, and wherein applying the first training batch to train the machine learning model comprises updated the pre-trained machine learning model.

EEE 11 is the method of any preceding EEE, further comprising: (i) obtaining a target training dataset the includes a plurality of training examples that represent a target task; and (ii) subsequent to applying the second training batch to further train the machine learning model, applying the target training dataset to further train the machine learning model to perform the target task.

EEE 12 is the method of any preceding EEE, wherein the first training batch includes at least four training examples corresponding to each of the training tasks.

EEE 13 is the method of any preceding EEE, wherein the second training batch includes at least four training examples corresponding to each of the training tasks.

EEE 14 is the method of any preceding EEE, further comprising: (i) applying the second training batch to further train the machine learning model; (ii) determining a second-batch per-task loss for each of the training tasks within the second training batch, wherein determining a second-batch per-task loss for a particular training task comprises determining a sample loss for the particular training task based on the determined sample losses for each of the training examples in the second training batch that correspond to the particular training task; and (iii) selecting, from the training examples of the training dataset, a third training batch that includes at least one training example corresponding to each of the training tasks and such that training tasks having higher second-batch per-task losses are represented by more training examples in the third training batch.

EEE 15 is the method of any preceding EEE, wherein the training dataset represents at least three to twenty-four different training tasks.

EEE 16 is the method of any preceding EEE, wherein the machine learning model receives as an input at least one audio clip.

EEE 17 is the method of any preceding EEE, wherein the machine learning model generates as an output a classification for an input of the machine learning model.

EEE 18 is the method of any preceding EEE, wherein the machine learning model is configured to receive a video as an input, and wherein applying an input to the machine learning model comprises: (i) applying each frame of an input video to an encoder of the machine learning model to generate a respective vector of image features; (ii) concatenating all of the generated vectors of image vectors together to generate an intermediate vector; and (iii) applying the intermediate vector to an additional portion of the machine learning model to generate an output of the machine learning model.

EEE 19 is a method for training a machine learning model, the method comprising: (i) obtaining a training dataset that includes a plurality of training examples, wherein each training example in the training dataset comprises a respective image and a respective bounding box, wherein a given bounding box indicates a location, within a frame of a corresponding image of the plurality of images, of a target object; (ii) generating a plurality of textual representations, wherein a given textual representation of the plurality of textual representations textually represents a location, within a frame of a corresponding image of the plurality of images, of a corresponding bounding box of the plurality of bounding boxes; and (iii) applying the plurality of images and the plurality of textual representations to train the machine learning model to output, based on an input image, a textual representation of a location, within a frame of the input image, of a target object.

EEE 20 is method for fine-tuning a machine learning model, the method comprising: (i) training a machine learning model using the method of any of EEEs 1-19; (ii) obtaining a fine-tuning dataset that represents at least one fine-tuning task; and (iii) applying the fine-tuning dataset to train the machine learning model, thereby improving the performance of the machine learning model with respect to the at least one fine-tuning task.

EEE 21 is a computer-implemented method comprising: (i) obtaining an input; and (ii) applying the input to a machine learning model to generate an output, wherein the machine learning model has been trained using the method of any of EEEs 1-20.

EEE 22 is the computer-implemented method of EEE 21, wherein the input includes text data.

EEE 23 is the computer-implemented method of EEE 21, wherein the input includes an image.

EEE 24 is the computer-implemented method of EEE 21, wherein the input includes at least one audio clip.

EEE 25 is the computer-implemented method of EEE 21, wherein the output includes text.

EEE 26 is a computing device comprising one or more processors, wherein the one or more processors are configured to perform the method of any of EEEs 1-25.

EEE 27 is an article of manufacture including a non-transitory computer-readable medium, having stored thereon program instructions that, upon execution by a computing device, cause the computing device to perform operations to effect the method of any of EEEs 1-25.

IX. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method for training a machine learning model, comprising:
   obtaining a training dataset that includes a plurality of training examples and that represents at least two different training tasks, wherein each training example corresponds to a respective training task;
   selecting, from the training examples of the training dataset, a first training batch that includes at least one training example corresponding to each of the training tasks;
   applying the first training batch to train a machine learning model, wherein applying the first training batch to train the machine learning model comprises determining a sample loss of the model with respect to each training example in the first training batch;
   determining a per-task loss for each of the training tasks, wherein determining the per-task loss for a particular training task comprises determining the sample loss for the particular training task based on the determined sample losses for each of the training examples in the first training batch that correspond to the particular training task; and
   selecting, from the training examples of the training dataset, a second training batch for training the machine learning model, wherein the second training batch includes at least one training example corresponding to each of the training tasks and such that training tasks having higher per-task losses are represented by more training examples in the second training batch.

2. The method of claim 1, wherein each training example includes at least an image or text data.

3. The method of claim 2, wherein the training tasks include at least one of visual question and answering, video question and answering, referring expressions, comprehension tasks, object localization, captioning, caption completion, image-text matching, or masked language modeling tasks.

4. The method of claim 2, wherein the machine learning model receives as inputs at least one of an image or text and the model generates text as an output.

5. The method of claim 4, wherein at least one of the training tasks is object localization, and wherein the model generating output text comprises generating a textual representation of a location of a target object within a frame of an input image, and wherein the method further comprises:
   generating the training examples of the training dataset that correspond to the object localization training task by:
   obtaining a set of raw training examples that include images and corresponding bounding boxes that define the location of objects of interest within the images; and
   determining, for each image in the raw training examples, a textual representation of a location of a target object within a frame of a corresponding input image based on the corresponding bounding box.

6. The method of claim 4, wherein the model comprises a ResNet encoder configured to receive an image as an input, an encoder that comprises a transformer and that is configured to receive text as an input, a decoder that comprises a transformer and that is configured to generate text as an output, and an intermediate model that receives, as inputs, outputs from the encoders and that provides, as an output, an input to the decoder.

7. The method of claim 1, wherein determining the per-task loss for the particular training task comprises:
   determining a total sample loss for all of the training examples of the first training batch;
   determining a total sample loss for all of the training examples in the first training batch that correspond to the particular training task; and
   determining a loss fraction for the particular training task by dividing the total sample loss for all of the training examples in the first training batch that correspond to the particular training task by the total sample loss for all of the training examples of the first training batch,
   wherein selecting the second training batch comprises selecting training examples of the training dataset such that training tasks having higher per-task loss fractions are represented by more training examples in the second training batch.

8. The method of claim 1, where determining a sample loss of the model with respect to each training example in the first training batch comprises determining a cross-entropy loss for each training example.

9. The method of claim 1, where determining a sample loss of the model with respect to each training example in the first training batch that corresponds to a first training task comprises determining a first type of loss, wherein determining a loss of the model with respect to each training example in the first training batch that corresponds to a second training task comprises determining a second type of loss that differs from the first type of loss, and wherein the method further comprises:
    normalizing at least one of the types of loss of the model with respect to each training example in the first training batch that corresponds to the first training task or the sample loss of the model with respect to each training example in the first training batch that corresponds to the first training task.

10. The method of claim 1, wherein the machine learning model is a pre-trained machine learning model, and wherein applying the first training batch to train the machine learning model comprises updated the pre-trained machine learning model.

11. The method of claim 1, further comprising:
    obtaining a target training dataset that includes a plurality of training examples that represent a target task; and
    subsequent to applying the second training batch to further train the machine learning model, applying the target training dataset to further train the machine learning model to perform the target task.

12. The method of claim 1, wherein the first training batch includes at least four training examples corresponding to each of the training tasks.

13. The method of claim 1, wherein the second training batch includes at least four training examples corresponding to each of the training tasks.

14. The method of claim 1, further comprising:
    applying the second training batch to further train the machine learning model; determining a second-batch per-task loss for each of the training tasks within the second training batch, wherein determining a second-batch per-task loss for a particular training task comprises determining a sample loss for the particular training task based on the determined sample losses for each of the training examples in the second training batch that correspond to the particular training task; and
    selecting, from the training examples of the training dataset, a third training batch that includes at least one training example corresponding to each of the training tasks and such that training tasks having higher second-batch per-task losses are represented by more training examples in the third training batch.

15. The method of claim 1, wherein the training dataset represents at least three to twenty-four different training tasks.

16. The method of claim 1, wherein the machine learning model generates as an output a classification for an input of the machine learning model.

17. The method of claim 1, wherein the machine learning model is configured to receive a video as an input, and wherein applying an input to the machine learning model comprises:
    applying each frame of an input video to an encoder of the machine learning model to generate a respective vector of image features;
    concatenating all of the generated vectors of image features together to generate an intermediate vector; and
    applying the intermediate vector to an additional portion of the machine learning model to generate an output of the machine learning model.

18. A method for fine-tuning a machine learning model to improve the performance of the machine learning model with respect to at least one fine-tuning task, the method comprising:
    obtaining a machine learning model that has been trained according to a method that comprises:
        obtaining a training dataset that includes a plurality of training examples and that represents at least two different training tasks, wherein each training example corresponds to a respective training task;
        selecting, from the training examples of the training dataset, a first training batch that includes at least one training example corresponding to each of the training tasks;
        applying the first training batch to train a machine learning model, wherein applying the first training batch to train the machine learning model comprises determining a sample loss of the model with respect to each training example in the first training batch;
        determining a per-task loss for each of the training tasks, wherein determining the per-task loss for a particular training task comprises determining the sample loss for the particular training task based on the determined sample losses for each of the training examples in the first training batch that correspond to the particular training task; and
        selecting, from the training examples of the training dataset, a second training batch for training the machine learning model, wherein the second training batch includes at least one training example corresponding to each of the training tasks and such that training tasks having higher per-task losses are represented by more training examples in the second training batch;
    obtaining a fine-tuning dataset that represents the at least one fine-tuning task; and
    applying the fine-tuning dataset to train the machine learning model.

19. A computer-implemented method comprising:
obtaining an input; and
applying the input to a machine learning model to generate an output, wherein the machine learning model has been trained by:
    obtaining a training dataset that includes a plurality of training examples and that represents at least two different training tasks, wherein each training example corresponds to a respective training task;
    selecting, from the training examples of the training dataset, a first training batch that includes at least one training example corresponding to each of the training tasks;
    applying the first training batch to train a machine learning model, wherein applying the first training batch to train the machine learning model comprises determining a sample loss of the model with respect to each training example in the first training batch;
    determining a per-task loss for each of the training tasks, wherein determining the per-task loss for a particular training task comprises determining the sample loss for the particular training task based on the determined sample losses for each of the training examples in the first training batch that correspond to the particular training task; and
    selecting, from the training examples of the training dataset, a second training batch for training the machine learning model, wherein the second training batch includes at least one training example corresponding to each of the training tasks and such that training tasks having higher per-task losses are represented by more training examples in the second training batch.

20. The computer-implemented method of claim 19, wherein at least one of: (i) the input includes text data, (ii) the input includes an image, (iii) the input includes at least one audio clip, or (iv) the output includes text.

* * * * *